(12) United States Patent
Spungin

(10) Patent No.: US 12,499,088 B2
(45) Date of Patent: Dec. 16, 2025

(54) STAGED RESOURCE QUERYING

(71) Applicant: Steven Spungin, Marblehead, MA (US)

(72) Inventor: Steven Spungin, Marblehead, MA (US)

(*) Notice: Subject to any disclaimer, the term of this patent is extended or adjusted under 35 U.S.C. 154(b) by 0 days.

(21) Appl. No.: 18/934,354

(22) Filed: Nov. 1, 2024

(65) Prior Publication Data

US 2025/0139055 A1   May 1, 2025

Related U.S. Application Data

(60) Provisional application No. 63/595,173, filed on Nov. 1, 2023.

(51) Int. Cl.
*G06F 16/14* (2019.01)
(52) U.S. Cl.
CPC .......... *G06F 16/148* (2019.01); *G06F 16/144* (2019.01)
(58) Field of Classification Search
CPC .............................. G06F 16/148; G06F 16/144
See application file for complete search history.

(56) References Cited

U.S. PATENT DOCUMENTS

| | | | |
|---|---|---|---|
| 9,576,007 B1* | 2/2017 | Sivathanu | G06F 16/2228 |
| 11,262,935 B2 | 3/2022 | Liu | |
| 11,455,305 B1* | 9/2022 | Hwang | G06F 16/24549 |
| 2008/0049022 A1* | 2/2008 | Sherb | G06Q 10/06 345/440 |
| 2018/0189435 A1 | 7/2018 | Muthiah | |
| 2019/0266163 A1* | 8/2019 | Johnson | G06F 16/248 |
| 2020/0162466 A1 | 5/2020 | Dabbiere | |
| 2020/0192897 A1* | 6/2020 | Halstead | G06F 16/2471 |
| 2023/0326222 A1 | 10/2023 | Hron, II | |

FOREIGN PATENT DOCUMENTS

| | | |
|---|---|---|
| CN | 104536804 A | 4/2015 |
| CN | 112134786 A | 12/2020 |

OTHER PUBLICATIONS

International Search Report and Written Opinion issued in App. No. PCT/US2024/054057 dated May 13, 2025, 8 pages.

* cited by examiner

*Primary Examiner* — William Spieler
(74) *Attorney, Agent, or Firm* — Blueshift IP; Robert Plotkin

(57) ABSTRACT

A computer-implemented system and method for staged resource querying addresses limitations of traditional file systems, which provide a flexible, scalable framework for organizing, managing, and querying diverse digital resources across multiple providers. The method receives a query specifying a sequence of stage types, each defining processing and grouping of items. It executes operations to process input items through these stages, creating a dynamic graph structure of grouped output items. This includes taking items from a resource iterator, processing them through specified stages, and organizing results into groups. The method enables incremental processing of resources, allowing efficient handling of large datasets and complex queries. It provides mechanisms for propagating items through the stage graph, offering fine-grained control over resource processing and grouping at each stage. This approach enables powerful, flexible querying and organization of digital resources, addressing limitations of traditional file systems and content management solutions.

28 Claims, 8 Drawing Sheets

STAGED RESOURCE QUERYING

CROSS-REFERENCE TO RELATED APPLICATIONS

This application claims priority to U.S. Prov. Pat. App. No. 63/595,173, filed on Nov. 1, 2023, entitled, "Managing Distributed Resources Using Projections, Hierarchical Tag Graphs, and Structured Queries," which is incorporated by reference herein.

BACKGROUND

In the digital age, the management and organization of digital resources have become increasingly complex and challenging. Traditional file systems and content management solutions, which have remained largely unchanged since the 1960s, are struggling to meet the demands of modern computing environments.

The current landscape of digital resource management is characterized by several key limitations. Conventional file systems rely heavily on hierarchical folder structures, which can be inflexible and limiting when dealing with diverse types of digital assets. These traditional systems are primarily designed to handle files and folders, failing to adequately address the wide array of digital resources that exist today, such as streaming media, database records, AI-generated content, and more.

In most existing systems, the organization of resources is tightly coupled with the resources themselves. This makes it challenging to create multiple organizational views or structures without duplicating data. Furthermore, current systems often lack efficient mechanisms for querying and retrieving resources across diverse providers and types, especially when dealing with large-scale datasets.

With the proliferation of cloud services and diverse storage solutions, users must manage resources across multiple providers, each with its own interface and organizational structure.

Existing systems often lack a unified abstraction layer that can represent and manage diverse resource types consistently. As the volume and variety of digital resources grow, traditional systems struggle to provide scalable solutions for organizing, querying, and managing these resources efficiently.

Another shortcoming of file systems, content management systems, and data stores is their limited querying capabilities. While conventional queries can improve resource discoverability to some extent, they lack the advanced querying and filtering mechanisms necessary for efficiently managing and retrieving resources at scale. This becomes particularly problematic as the volume and complexity of digital assets continue to grow.

Current file systems are restricted to a flat single-level grouping of resources, by means of features such as tags, categories, and "smart folders." Such smart folders, however, are flat in the sense that a smart folder cannot contain other smart folders. This limitation significantly constrains the ability to create complex, hierarchical organizational structures for digital resources.

Current systems also lack the ability to map, derive, and generate resources as part of the file system hierarchy. The systems may group resources, but not manipulate or generate them. This limitation restricts the flexibility and power of resource management, especially in scenarios where dynamic content generation or complex data transformations are required. The inability to manipulate and generate resources within the file system hierarchy significantly constrains the system's adaptability to evolving data processing needs.

Current systems also lack the ability to organize generated and derived resources. This shortcoming creates a significant gap in managing dynamically created or transformed content, such as that created using generative AI. As digital ecosystems increasingly rely on real-time data processing, AI-generated content, and complex data transformations, the inability to effectively organize these derived resources hampers the overall efficiency and usability of the system.

Furthermore, current systems are restricted to resources as being the leaf in the hierarchy. Files, for example, are always leaves in the hierarchies that contain them. This limitation imposes a rigid structure on the organization of digital assets, preventing the creation of more flexible and intuitive organizational schemes. The inability for a resource to serve both as content and as a container for other resources restricts the depth and sophistication of resource organization, making it challenging to represent and manage the intricate relationships between diverse types of digital assets effectively.

These limitations collectively contribute to the inadequacy of current systems in meeting the complex demands of modern digital resource management. They highlight the need for more advanced solutions that can provide greater flexibility, dynamic resource handling, and hierarchical organization capabilities to effectively manage the diverse and evolving landscape of digital assets.

These and other limitations have created a pressing need for a more flexible, scalable, and powerful approach to digital resource management. Despite advancements in various aspects of computing, the fundamental challenges in digital resource management remain largely unaddressed, creating a significant gap in the ability of organizations and individuals to effectively organize, access, and utilize their growing digital assets.

The information in this Background section is provided herein for the purpose of generally presenting the context of the disclosure. The materials described in this section are not admitted to be prior art by their inclusion in this section. Work described herein as existing or being known, unless otherwise indicated, may or may not be prior art.

SUMMARY

A computer-implemented system and method enable staged resource querying, designed to address the limitations of traditional file systems, content management solutions, and data stores. This approach provides a flexible, scalable, and powerful framework for organizing, managing, querying, deriving, and generating diverse digital resources across multiple providers.

The method may receive a query that specifies a sequence of stage types, each defining how to process and group items. The method then executes a series of operations to process input items through these stages, creating a dynamic graph structure of groups and grouped output items. This process includes taking items from a resource iterator, processing them through the specified stages, and organizing the results into groups. The method allows for incremental processing of resources, enabling efficient handling of large datasets and complex queries. It also provides mechanisms for propagating items through the stage graph, offering fine-grained control over how resources are processed and grouped at each stage. This approach enables powerful, flexible querying and organization of digital resources, addressing many of the limitations present in traditional file systems, content management solutions, and data stores.

Other features and advantages of various aspects and embodiments of the present invention will become apparent from the following description and from the claims.

DETAILED DESCRIPTION

Figure 1A:
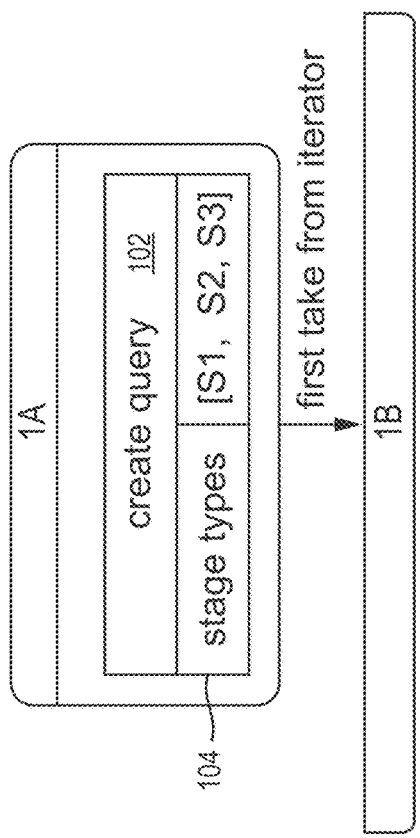
FIGS. 1A-1E are diagrams that represent a staged querying process according to one embodiment of the present invention.

Traditional file systems, content management solutions, and data stores have long struggled to meet the evolving demands of modern computing environments. These systems, largely unchanged since the 1960s, are characterized by rigid hierarchical structures, limited resource type support, and inefficient querying mechanisms, particularly when dealing with large-scale and diverse digital assets. Embodiments of the present invention address these long-standing challenges by introducing a novel approach to digital resource management. The system and method described herein provide a flexible, scalable, and powerful framework for organizing, managing, querying, deriving, and generating diverse digital resources across multiple providers.

In particular, embodiments of the present invention introduce a staged query system that enables efficient and customizable processing and organization of digital resources.

In one embodiment, a method receives a query that specifies a sequence of stage types, each defining how to process and group items. It then executes a series of operations to process input items through these stages, creating a dynamic graph structure of groups and grouped output items. This process includes taking items from a resource iterator, processing them through the specified stages, and organizing the results into groups. The method allows for incremental processing of resources, enabling efficient handling of large datasets and complex queries. It also provides mechanisms for propagating items through the stage graph, offering fine-grained control over how resources are processed and grouped at each stage.

A stage may process an input in any manner, whether or not that processing results in output that is similar or related to the input. The output may, for example, not contain the input, and may not contain any data that is contained in the input. For instance, a stage may translate text to a different language, generate a text summary or image from the input, extract keywords, or generate an unrelated resource. This capability allows for complex transformations and generations within the staged query system, enhancing its flexibility and power in handling diverse data processing scenarios.

By addressing the limitations present in traditional file systems, content management solutions, and data stores, embodiments of the present invention offer a powerful and flexible approach to querying and organizing digital resources, paving the way for more efficient and effective management of the ever-growing digital landscape.

Before describing specific embodiments of the present invention, certain terms related to embodiments of the present invention will be explained.

A stage type defines how input items are processed and grouped within a specific stage of query execution. A query specifies a plurality of stage types in a particular order. Each stage type S in this sequence may include at least two components:

A processing method: This method defines how stage items are processed within the stage corresponding to type S.

A grouping method: This method specifies groups created, with each group assigned a unique group ID among other groups within the stage, and how the processed stage items are assigned to groups within the stage.

The use of stage types allows for a flexible and customizable approach to resource querying. By defining different stage types, users can create complex query pipelines that process and organize resources in highly specific ways.

When the method executes a query, it processes input stage items through each stage type in the specified order. For each stage, the stage receives input from the previous stage type, such as groups and grouped stage items, and then: (1) processes the input stage items using the processing method defined by its stage type; (2) generates groups using the grouping method defined by its stage type; and (3) groups the resulting output stage items using the grouping method defined by its stage type. This process creates a dynamic graph structure of groups and grouped output items, where each stage's groups and grouped output becomes the input for the next stage in the sequence.

The use of stage types by embodiments of the present invention is particularly powerful because it allows for the creation of reusable, modular components in query processing. Users can define stage types that perform specific operations (e.g., filtering, transforming, generating, or aggregating data) and then combine these stage types in various ways to create complex queries. Furthermore, the use of stage types enables embodiments of the present invention to optimize query execution. Since each stage type has well-defined processing and grouping methods, embodiments of the present invention can potentially parallelize operations or apply other optimizations based on the characteristics of each stage type.

Stage paths provide a way to identify and reference specific stages or groups within the dynamic graph structure created by the query processing. Stage paths are used to indicate specific stages in a stage graph. Because each stage's input is received from a group that has a unique group ID amongst its siblings, any particular stage can be identified as a sequence of group IDs, starting from the root stage and proceeding to a target stage. Stage paths can reference stages that have not been realized.

In the context of embodiments of the present invention, a resource represents any digital entity that can be managed, organized, or queried within the system. Resources may encompass a wide range of digital assets, including but not limited to files, documents, media streams, database records, web services, and generated or derived content.

Resource providers are components that contribute resources to the system. Each resource provider has a globally unique identifier and is responsible for exposing resources through a standardized interface. Resource providers can represent various sources of digital content, such as physical file systems, cloud-based storage services, databases, or dynamic content generation services.

The ability of embodiments of the present invention to work across multiple resource providers offers several significant benefits:

Unified Access: Users can query and manage resources from diverse sources through a single, consistent interface, eliminating the need to switch between different systems or interfaces for different types of resources.

Provider-Agnostic Querying: The staged query system can operate on resources from any provider that conforms to the required interface, allowing for complex queries that span multiple providers and resource types.

Extensibility: New resource providers can be easily integrated into the system, allowing it to adapt to new storage technologies, services, or content types as they emerge.

A resource iterator serves as an abstraction layer between the query processing stages and the underlying resource providers, enabling efficient and flexible access to diverse digital resources. A resource iterator incrementally queries resource providers and supplies stage items associated with the resources returned from these providers to the root stage of a stage graph. This incremental approach allows for efficient handling of large datasets and complex queries, as it eliminates the need to load all resources into memory at once.

A single resource iterator may aggregate multiple resource providers, which can return different types of resources. This aggregation allows the system to work seamlessly across various resource providers, such as physical file systems, cloud-based storage, databases, video streams, REST services, and generative media services. By unifying access to these diverse sources, the resource iterator enables the system to perform queries that span multiple providers and resource types.

As will be described in more detail below, a resource iterator may adapt dynamically to query operations and other conditions. For example, a resource iterator may progressively cache, filter, order, and prioritize resources in response to incremental query operations.

The resource iterator also plays a valuable role in the scalability and efficiency of the system. For example, it can dynamically allocate and filter resources based on a query's create, take, and configure operations. Filtering may occur directly through a resource provider or locally within a resource iterator cache, allowing for optimized resource retrieval.

In embodiments of the present invention, the create command serves to initialize a query in preparation for subsequent take operations. It is responsible for setting up the stage types, their configurations, and other query parameters. More specifically, the create command may perform functions such as initializing the stage graph structure based on the specified stage types, setting up the resource iterator with the provided criteria, configuring initial filtering and allocation settings, and preparing the query for subsequent take operations. The create command may perform preliminary communication with aggregated resource providers, depending on criteria such as preload caching or when calculating an estimated total item count. It is important to note that the create command does not necessarily process any resources immediately. Instead, it sets up the framework for incremental processing through subsequent take operations.

The create command may receive any one or more of the following parameters as inputs:
stages: An array of stage types to be included in the query (required)
iterator: Criteria for the resource iterator
stagePaths: Record of stage paths to include or exclude
groupCache: Options for caching stage group IDs
queue: Options for stage input queues
providerQueue: Queue setting overrides for specific providers.
take: Default take options for further take commands
debug: Options for debugging and tracing a query The create command may provide any one or more of the following parameters as outputs:
rootStage: Represents the initial stage in the stage graph
take: A function to execute take operations on the initialized query
configure: A function to modify query parameters
prune: A function to remove stages from the stage graph
purge: A function to remove items from stage queues
isTaking: A property indicating if a take operation is in progress
moreResources: A property indicating if more resources are available The use of the create command offers several benefits. For example, it enables users to define complex query pipelines by specifying a sequence of stage types, each with its own processing and grouping methods. The create command also supports various options for fine-tuning query behavior, including iterator options, stage path specifications, and queue configurations. By specifying the entire query structure upfront using the create command, the system can potentially optimize query execution based on the characteristics of each stage type. The create command also separates the query initialization from its execution, allowing for better control and potential reuse of query configurations. The create command's structure allows for easy addition of new stage types and configuration options, making the system highly extensible.

In embodiments of the present invention, the take command is responsible for incrementally realizing the stage graph by processing input items through the specified stages. More specifically, the take command receives input items from stage input sources (such as queues, iterators, or other sources) until specified conditions are met. It processes these items through the stages defined in the query, creating and populating the stage graph incrementally.

The take command may receive one or more of the following parameters as inputs:
subject: A stage path used as the reference for other parameters and a hint for allocation.
from: The stage path inputs used to take, process, and group stage items from
until: Conditional criteria to indicate when to stop taking resources
propagate: Options indicating how to handle stage items on a stage-by-stage basis
overflow: Instructions on how to handle queued items when they exceed queue limits
inputFilter: A function to filter stage input items The take command may be asynchronous; For example, it may return a promise that resolves when the operation is complete.

The take command has a variety of benefits. For example, it allows for gradual processing of resources, supporting efficient handling of large datasets. Furthermore, the take command's use of the until condition provides fine-grained control over how many resources are processed in each iteration. The take command's "propagate" option allows for specifying how stage items should be handled at different stages of the graph. The take command can also adjust its processing based on intermediate results or changing conditions.

Stage processing refers to the operation performed by each stage to transform input stage items into output stage items according to the processing method specified by the stage type. Stage processing involves several aspects within embodiments of the present invention. For example, each stage may process input items to produce output items, allowing for complex transformations of data as it moves through the stage graph. The processing method of each stage type may have specific query logic, enabling the system to perform diverse operations on the input data. The output items produced by stage processing are subsequently grouped, forming the basis for the dynamic graph structure. Stage processing occurs as part of the take command execution, and plays an important role in enabling incremental processing of resources.

When a stage processes its input stage items to produce its output stage items, there may or may not be a 1-to-1 correspondence between the number of input stage items and the number of output stage items. The processing performed by a stage may result in various outcomes in terms of the quantity of output stage items produced. For example, the number of output stage items may be greater than or less than the number of input stage items.

As one example, processing of input stage items by a stage may generate additional output stage items, in which case the number of output stage items may be greater than the number of input stage items. This capability enables stages to create new stage items or deriving multiple outputs from a single input.

Conversely, the processing may filter input stage items, resulting in fewer output stage items than input stage items. This allows stages to selectively process or exclude certain items based on specific criteria.

A stage may perform complex transformations on its input stage items, potentially resulting in a different number of output stage items. For instance, a stage may combine multiple input stage items into a single output stage item, or split a single input stage item into multiple output stage items.

Stage processing has a variety of benefits. For example, different stage types can implement various processing methods, allowing for a wide range of query operations to be performed on the input data. The ability of each stage to process items independently promotes a modular design that enhances reusability and maintainability of query components. The incremental nature of stage processing allows the system to handle large volumes of data efficiently, processing items as they become available. Users can define custom stage types with specific processing methods, tailoring the system to their unique requirements. In addition, the well-defined processing methods of each stage type allow for potential optimizations, such as parallelization or caching of intermediate results.

After each stage processes its input stage items to produce its output stage items, the stage groups the output stage items according to the grouping method specified by the stage's stage type. This grouping process involves creating groups, assigning group IDs, and assigning output stage items to these groups.

Stage grouping organizes the output stage items into logical groups, providing structure to the processed data. The groups created by each stage form nodes in a dynamic graph structure, enabling complex relationships between resources to be represented. The grouped output from one stage becomes the input for the next stage in the sequence, allowing for hierarchical processing of resources. Grouped items can be processed independently, supporting the incremental nature of the staged query system.

Although group IDs must be unique among a stage, they may be identical among sibling stage groups of the same stage type. This feature allows for a more flexible organization of resources within the stage graph structure, potentially enabling the system to represent parallel or related processing paths.

Note that a group may be created without assigning any stage items to it. This ability of embodiments of the present invention emphasizes the distinction between groups and the stage items they contain, and the independent utility of such groups. For example, groups that do not contain any stage items may serve as placeholders for items that may be added in future processing or query operations. This allows the system to maintain a consistent structure even when certain categories are temporarily empty. As another example, empty groups may be used to optimize query performance by pre-establishing categories that may be populated in subsequent operations, reducing the need for dynamic group creation. Another example is that groups themselves may represent the intended calculation or result of the query.

Some stage groups may represent system-wide categories that provide additional context or status information about the processing of resources. Examples of such categories include:

"Not-applicable" to the stage: Indicating that certain resources or items do not apply to the current stage's processing.

"Processing in progress": Denoting that the stage is currently working on the items in the group.

"Processing error": Signifying that an error occurred during the processing of the items in the group.

"Processing cancelled": Indicating that the processing for the items in the group was cancelled.

"Processing timeout": Denoting that the processing for the items in the group exceeded a specified time limit.

These system-wide categories enhance the staged query system's ability to manage and track the status of resources throughout the processing pipeline. They provide valuable metadata that can be used for error handling, performance optimization, and overall system management.

Such grouping has a variety of benefits. For example, different stage types can implement different grouping methods, allowing for diverse organizational schemes to be applied to the processed data. Furthermore, the grouping process enables the creation of hierarchical structures, which can represent complex relationships between resources more effectively than traditional file systems. In addition, grouped items can be more efficiently queried and processed in subsequent stages, potentially improving overall system performance. Users can define custom stage types with specific grouping methods, tailoring the organization of resources to their unique requirements. Furthermore, the grouping process supports the system's ability to handle large volumes of data by organizing it into manageable, logically related sets.

Each stage path can be associated with a corresponding propagate operation. A propagate operation determines the behavior of a stage when it receives input stage items. Embodiments of the present invention support various propagate operations, which control how stage items are handled and processed as they move through the stage graph. Examples of propagate operations that may be supported and implemented by embodiments of the present invention include:

"process": This operation instructs the stage to (1) transform input stage items into output stage items; (2) generate groups with stage unique, stage-type unique, or system-wide group IDs; and (3) assigns output stage items to generated groups.

"discard" type: This operation directs the stage to discard the input stage items after receiving them.

"queue" type: This operation instructs the stage to place the input stage items into a queue for later processing.

"group-discard" type: This operation instructs the stage to (1) transform input stage items into output stage items; (2) Generate groups with stage-unique group IDs; and (3) Discard output stage items.

Propagate operations perform a variety of useful functions within embodiments of the present invention. For example, propagate operations determine how stage items move through the stage graph, allowing for fine-grained control over the query execution process. By specifying different propagate operations, the system can efficiently manage computational resources, processing only that which is necessary at each stage. Propagate operations allow users to tailor the behavior of each stage in the query, enabling complex and flexible query patterns.

The variety of propagate operations provides users with multiple options for handling stage items, accommodating diverse querying scenarios and resource types. Propagate operations such as "discard" and "group-discard" allow the system to optimize resource usage by eliminating unnecessary processing. The "queue" propagate operation enables deferred processing, supporting the system's ability to handle large datasets or real-time data streams incrementally. The availability of different propagate operations increases the expressive power of the query system, allowing for more sophisticated and nuanced queries.

The term "filtering" refers herein to the process of selectively processing or excluding resources and stage items based on various criteria at multiple levels of the staged query system. For example, embodiments of the present invention may perform filtering at a variety of levels, such as:

Resource Provider Level: Filtering may occur at the initial stage of resource retrieval. For example, the system may issue filter queries to resource providers, evaluating and selecting resources based on specific criteria before they enter the stage graph.

Stage Level: Individual stages may apply filtering as part of their processing method, selectively processing or excluding input stage items.

Query Level: The query itself may specify include and exclude stage paths, allowing for broad filtering across the entire query execution.

Take Command Level: Filtering may be applied dynamically during the execution of take commands, providing fine-grained control over which resources are processed at runtime.

Filtering has a variety of benefits within embodiments of the present invention. For example, by processing only relevant resources and stage items, the system can optimize computational resource usage and enhances overall query performance. The multi-level filtering approach provides users with powerful tools to construct precise and targeted queries, supporting a wide range of data processing scenarios. Filtering mechanisms can also help to manage large datasets by allowing the system to focus on specific subsets of data, facilitating the handling of massive volumes of resources. The ability to apply and modify filters throughout the query process enables the system to adapt to changing data characteristics and query requirements in real-time. Filtering at the resource provider level allows for efficient integration with diverse data sources, leveraging provider-specific optimizations where available.

The term "allocating" refers herein to the process of selecting and distributing resources from different resource providers and queues to be processed by the query system. Allocating may include, for example, deciding which resource providers to use, which items to queue, and which items to output or process further. For example, allocating may include choosing which resource providers to pull data from in a take operation, such as in a round-robin fashion. As another example, allocating may include deciding which items to hold in a queue for later processing, rather than discarding them. As yet another example, allocating may include determining which items to pass on to the next stage of processing or to include in the final output of a stage. One particular example is size-based allocation, which may include taking all items from a resource provider, but only outputting items that satisfy a particular size criterion, and caching items that do not satisfy the size criterion.

Embodiments of the present invention enable allocation behavior to be fine tuned, such as by using an "allocate" parameter in the create operation. The allocate parameter may, for example, be set to a value which determines the number of items to take from each resource provider before moving to the next in the round-robin cycle.

Allocation plays several important roles in the staged query system. For example, by distributing resource retrieval across multiple resource providers, the system effectively manages the load and prevents over-reliance on a single data source. Allocation strategies can be tailored to enhance overall query execution speed and efficiency, adapting to the characteristics of different resource providers. Allocation mechanisms contribute to the system's ability to handle large-scale datasets by intelligently managing how resources are retrieved and processed from multiple providers.

Filtering and allocating can play an important role in optimizing the performance of the staged query system by expediting the propagation of stage items to paths of interest, such as the "subject" of a take operation. This optimization technique leverages the system's ability to dynamically adapt and prioritize resource processing based on the query's requirements.

For example, by applying filters at different levels (resource provider, stage, query, or take command), the system can quickly identify and prioritize stage items that are most likely to propagate to the path of interest. This early elimination of irrelevant data allows the system to concentrate its resources on processing and routing the most pertinent items, thus expediting their propagation through the stage graph.

When allocating resources, the system can use the "subject" of a take operation as a hint to prioritize certain resources or providers that are more likely to produce stage items relevant to the path of interest. This targeted allocation ensures that resources most likely to contribute to the desired output are processed earlier and more efficiently.

When filtering and allocating are used together, they can create a powerful optimization mechanism, in which filtering narrows down the set of potentially relevant stage items, reducing the overall volume of data to be processed, and allocation then prioritizes the processing of these filtered items, ensuring that resources are distributed efficiently to handle the most promising data first. This combination allows the system to quickly identify, process, and route stage items that are most likely to propagate to the path of interest, such as the "subject" of a take operation.

Caching within embodiments of the present invention provides a mechanism for temporarily storing and quickly retrieving resources and stage items, enhancing the efficiency and performance of the query execution process. For example, the resource iterator, which provides input to the stage graph, may cache resources to optimize retrieval and filtering operations. In particular, a resource iterator may aggregate multiple resource providers and can adapt its iteration by progressively caching, filtering, ordering, and prioritizing in response to incremental query operations and other conditions.

Caching may be used to optimize the efficiency and performance of the query execution process within the staged query system. For example, metadata and content from resources may be cached and made available to stage type processors, providing several benefits to the overall system performance. By caching metadata and content from resources, the system can:

Reduce redundant data retrieval: Frequently accessed resource information may be stored in cache, minimizing the need to repeatedly fetch data from original sources.

Accelerate processing: Stage type processors may quickly access cached metadata and content, speeding up their operations and reducing overall query execution time.

Enhance consistency: Caching ensures that the same data is provided to stages between multi-stage propagation and across multiple take operations, maintaining consistency throughout the query execution process, especially in the event that the source data changes between multiple stages of propagation or multiple take operations.

Optimize resource utilization: By reducing the need for repeated data retrieval and processing, caching helps in more efficient use of system resources, particularly beneficial when dealing with large datasets or complex queries.

Improve responsiveness: With cached data readily available, the system may provide faster responses to queries, especially for frequently accessed resources or commonly used metadata.

This caching mechanism aligns with the system's overall approach to incremental processing and efficient resource management. It complements other optimization techniques such as filtering and allocating, further enhancing the system's ability to handle diverse digital resources and complex queries efficiently.

Embodiments of the present invention also support caching of stage groups, which can be utilized before any query operations have been issued. For example, it can be useful to cache the group IDs a stage generates. This cache can be utilized before any query operations have been issued.

Embodiments of the present invention allow for configuration of caching behavior through options specified in the query creation process. For example, the create operation may include a "cache" parameter for setting options related to loading and preloading resources from resource providers.

Caching helps improve the overall performance of the staged query system by reducing the need for repeated resource retrieval and processing. Caching also facilitates the incremental processing capabilities of the staged query system by allowing efficient storage and retrieval of intermediate results. By caching stage groups and resources, the system can provide faster responses to queries, especially for frequently accessed data. Caching also contributes to efficient resource management across multiple providers, supporting the system's ability to handle diverse digital resources.

As stages process and group items, they create a flexible, hierarchical organization of resources, referred to herein as a "stage graph," that allows for advanced querying and organization capabilities. The stage graph allows for the creation of multi-level hierarchies of grouped resources, enabling complex relationships to be represented efficiently. The graph is built dynamically as stages process, calculate groups, and group items, supporting the system's ability to handle large datasets incrementally. The structure adapts based on the processing and grouping methods of each stage, allowing for customized organization schemes.

The stage graph provides a variety of benefits. For example, the stage graph can efficiently represent and organize large volumes of diverse resources, supporting the system's ability to handle complex datasets. Unlike traditional file systems with rigid folder hierarchies, the stage graph allows for multiple organizational views of the same resources. The dynamic nature of the graph allows it to evolve as new resources are added or as query requirements change, providing a more responsive and adaptable system. The graph can represent relationships between various types of resources from different providers, offering a unified view of heterogeneous data.

Output stage items in the staged query system include a context that may be used to publish additional data to downstream stages. This context serves as a mechanism for propagating important information through the stage graph, enhancing the system's ability to track and analyze the flow of data.

For example, this context of an output stage item may include a link to the input stage item from which the output stage item was generated. This link provides a connection between the output and its source, allowing for traceability within the query execution process. By maintaining these links, the system enables backtracking through all generating sources, creating a complete lineage for each stage item.

This backtracking capability offers significant benefits to both the query client and any downstream stage type processors. It allows them to reference the source of any given stage item, providing valuable context for data analysis, debugging, and optimization. For example, the ability to trace the origin of each stage item helps in understanding how data has been transformed and processed throughout the query execution. If issues arise, the system may easily trace back to the source of the problem, facilitating more efficient troubleshooting. Furthermore, downstream processors may leverage the source information to perform more sophisticated analyses, taking into account the entire data transformation journey.

In short, by incorporating a stage graph, embodiments of the present invention provide a powerful and flexible mechanism for organizing, querying, transforming, and generating diverse digital resources across multiple providers. This approach addresses many limitations of traditional file systems and content management solutions, offering a more adaptable and efficient method for handling complex data relationships and facilitating advanced querying capabilities.

As described above, incremental processing is a feature of embodiments of the staged query system. This approach allows the system to process resources in the execution of a query gradually, in smaller batches, rather than all at once, enabling efficient handling of large datasets and complex queries.

By processing resources incrementally, the system can manage large volumes of data without overwhelming system resources. For example, the take command and until condition allow for fine-grained control over how many resources are processed in each iteration. Such incremental processing enables the system to adjust its processing based on intermediate results or changing conditions, supporting more dynamic and responsive queries. Incremental processing also enables the system to handle continuous streams of data, processing items as they become available.

The staged query system's incremental processing approach offers significant advantages in terms of resource allocation, filtering, and handling complex stage graph structures. By processing queries incrementally, the system can dynamically adapt its operations to optimize performance and efficiency. For example, the incremental nature of query processing allows the system to allocate and filter resources in response to each incremental request. This adaptive behavior is exemplified by the resource iterator's ability to modify its operation based on the subject stage path of the take operation. This dynamic adjustment enables the system to focus on the most relevant resources for each stage of the query, potentially reducing unnecessary data processing and improving overall query performance.

Furthermore, incremental processing is valuable for efficiently handling the potentially exponential number of stage graph branches that can be generated by the stage graph. As queries become more complex and the stage graph expands, the number of possible paths and branches can grow exponentially. By processing the query incrementally, the staged query system can manage this complexity more effectively, focusing on relevant branches and paths as needed, rather than attempting to process all possible branches simultaneously.

By processing queries incrementally, the staged query system can efficiently handle datasets of any size, from small collections to massive data stores—and even infinite data stores, such as those produced by generative AI systems—by processing them in manageable chunks. Incremental processing also enables users to start receiving results earlier, as the system does not need to process the entire dataset before returning any output. By processing data incrementally, the system can better manage memory usage and computational resources, potentially improving overall performance. The ability to specify until conditions allows users to control how much data is processed, enabling more flexible and efficient query patterns.

In short, by incorporating incremental processing, embodiments of the present invention provide a powerful and flexible mechanism for querying, processing, transforming, and generating diverse digital resources across multiple providers. This approach addresses many limitations of traditional file systems and content management solutions, offering a more adaptable and efficient method for handling large-scale data processing tasks and supporting real-time data analysis scenarios.

Figure 3A:
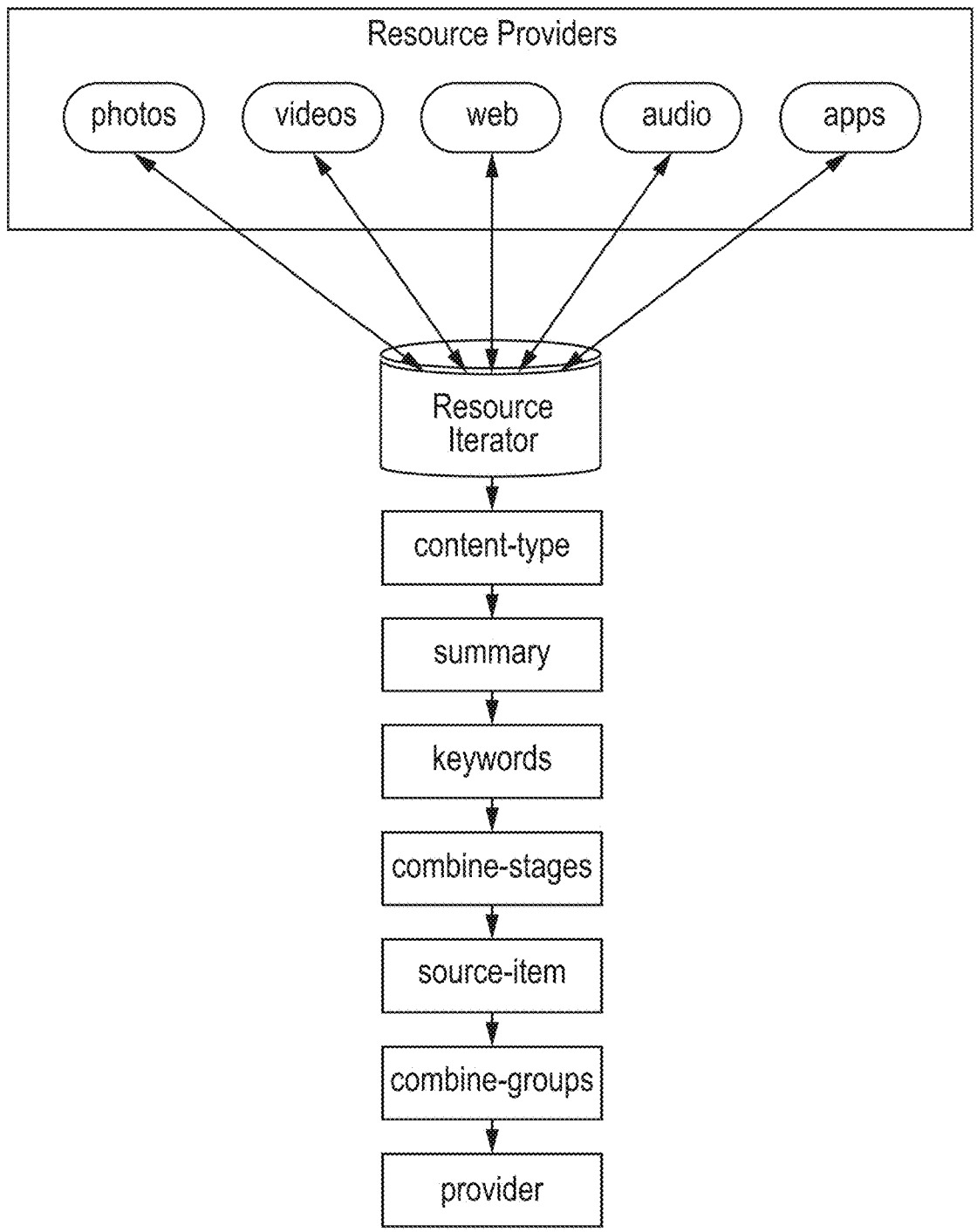
FIG. 3A is a diagram that illustrates a create operation, a corresponding plurality of a resource providers, a resource iterator, and a corresponding plurality of stages according to one embodiment of the present invention.

Referring to FIG. 3A, a diagram is shown illustrating an example use case of a create operation. The particular example illustrated in FIG. 3A is shown merely to illustrate the operation of one embodiment of the present invention, not to limit the scope of the description or claims herein.

In the create operation of FIG. 3A, the following stage types are specified in the following order: content-type, summary, keywords, combine-stages, source, combine-groups, and provider. The purpose and function of these stage types will be described in more detail in the following description of the create operation of FIG. 3A. As described elsewhere herein and as will become clear from the following description, the order of these stage types is used in the execution of the create operation shown in FIG. 3A, and in any subsequent take operations.

FIG. 3A shows a resource iterator. Although the resource iterator does not actually receive or otherwise process any resources as part of executing the create operation, the resource iterator is shown in FIG. 3A to aid in understanding of the purpose of the create operation. For example, and as will be described in more detail below, in any subsequent take operations, the resource iterator may take (receive) resources from one or more resource providers. In the particular example of FIG. 3A, five resource providers are shown, but the particular number and types of resources shown in FIG. 3A are merely examples and do not constitute limitations of the present invention. The resource providers are labeled in FIG. 3A using the type of resource that each resource provider provides, namely: photos, videos, web, audio, and apps. For example, the "videos" resource provider may be YouTube, and the "audio" resource provider may be Spotify. In the particular example of FIG. 3A, each of the resource providers provides resources of a particular type (e.g., photos or videos), merely to make the example of FIG. 3A easier to understand. More generally, any particular resource provider may provide resources of one or more types.

In general, the create operation of FIG. 3A sets up a query structure for processing resources through a plurality of stages having the stage types specified by the create operation, in the order specified by the create operation. The create operation itself does not process any resources. Instead, it initializes the stage graph structure based on the specified stage types, sets up the resource iterator with provided criteria, configures initial filtering and allocation settings, and prepares the query for subsequent take operations. As shown in FIG. 3A, the create operation may make use of any stage type parameters associated with each of the specified stage types. This setup allows for flexible and powerful querying of diverse digital resources across multiple providers.

In particular, in the example of FIG. 3A, the first stage type in the plurality of stage types is a "content-type" stage type. Stages of this stage type may categorize resources based on their content type (e.g., text, image, video). Such stages may map input items 1:1 to output items, and may group output items by the content type of the associated resource.

In the example of FIG. 3A, the second stage type in the plurality of stage types is a "summary" stage type. Stages of this stage type are designed to analyze the content of the associated resource for each input item and generate summaries. Such a stage analyzes the content of the associated resource for each input item and groups the input items based on the generated summaries. For each group, the stage generates a new output item. Each output item is associated with the generated resource (summary). The stage may optionally map input items to output items in a one-to-one relationship. The summary stage type may include a "createResource" parameter. When this parameter is set to "true", the generated summary becomes the output stage item's associated resource.

In the example of FIG. 3A, the third stage type in the plurality of stage types is a "keywords" stage type. Stages of this stage type are designed to extract and group items based on keywords. For example, the stage may analyze the content for keywords. Notably, in this example, in which the previous stage was a "summary"-type stage, the content analyzed by the "keywords"-type stage is the generated summary from the previous stage, rather than the content of the originally associated resource. The stage may group the output items based on the analyzed keywords from the content. The stage may map input items to output items in a one-to-one relationship. The keywords stage type may include an "include" parameter, which contains a list of keyword types to include in the analysis. For example, it might be set to include only nouns and verbs.

In the example of FIG. 3A, the fourth stage in the plurality of stage types is a "combine-stages" stage type. Stages of this stage type are designed to merge multiple stages and their associated groups. Stages of this stage type combine all stages of the parent stage type into a single stage, allowing for consolidation of previously processed data. The stage may merge groups with other groups that have the same group ID, enabling the aggregation of related data across different stages. The combine-stages stage type may include a "stagePaths" parameter. This parameter specifies which stage paths should be included in the merge operation. In the given example, the value 'all_parent' indicates that all parent stages are to be merged. The combine-stages stage type may also include a 'combineGroups' parameter. When set to true, this parameter allows the combine-stages stage to combine groups from the parent stages, providing additional flexibility in data aggregation.

In the example of FIG. 3A, the fifth stage in the plurality of stage types is a "source-item" stage type. Stages of this stage type are designed to provide functionality for backtracking and creating individual groups for output items. Stages of this stage type associate output items with the initial iterated resource. This backtracking capability allows the system to maintain a connection between processed items and their original source. Stages of this stage type may create a new group for each output item. This one-to-one grouping strategy ensures that each processed item is individually identifiable within the stage graph.

In the example of FIG. 3A, the sixth stage in the plurality of stage types is a "combine-groups" stage type. Stages of this stage type are designed to merge groups from parent stages into a single group. Such stages map input items to output items in a one-to-one relationship, preserving the individual identity of each item. Stages of this stage type combine all groups from each parent stage into a single group. This consolidation allows for the aggregation of previously processed and grouped data. The stage type may include a "groupID" parameter, which specifies a group ID that is assigned to the combined group. In the given example, the groupID is set to 'combined'.

In the example of FIG. 3A, the seventh and final stage in the plurality of stage types is a "provider" stage type. Stages of this stage type are designed to group items based on their resource providers. Stages of this stage type map input items to output items in a one-to-one relationship. This preserves the individual identity of each item as it passes through the stage. Stages of this type group the output items based on their associated resource provider. This allows for organization and categorization of items according to their origin or source within the system.

Figure 3B:
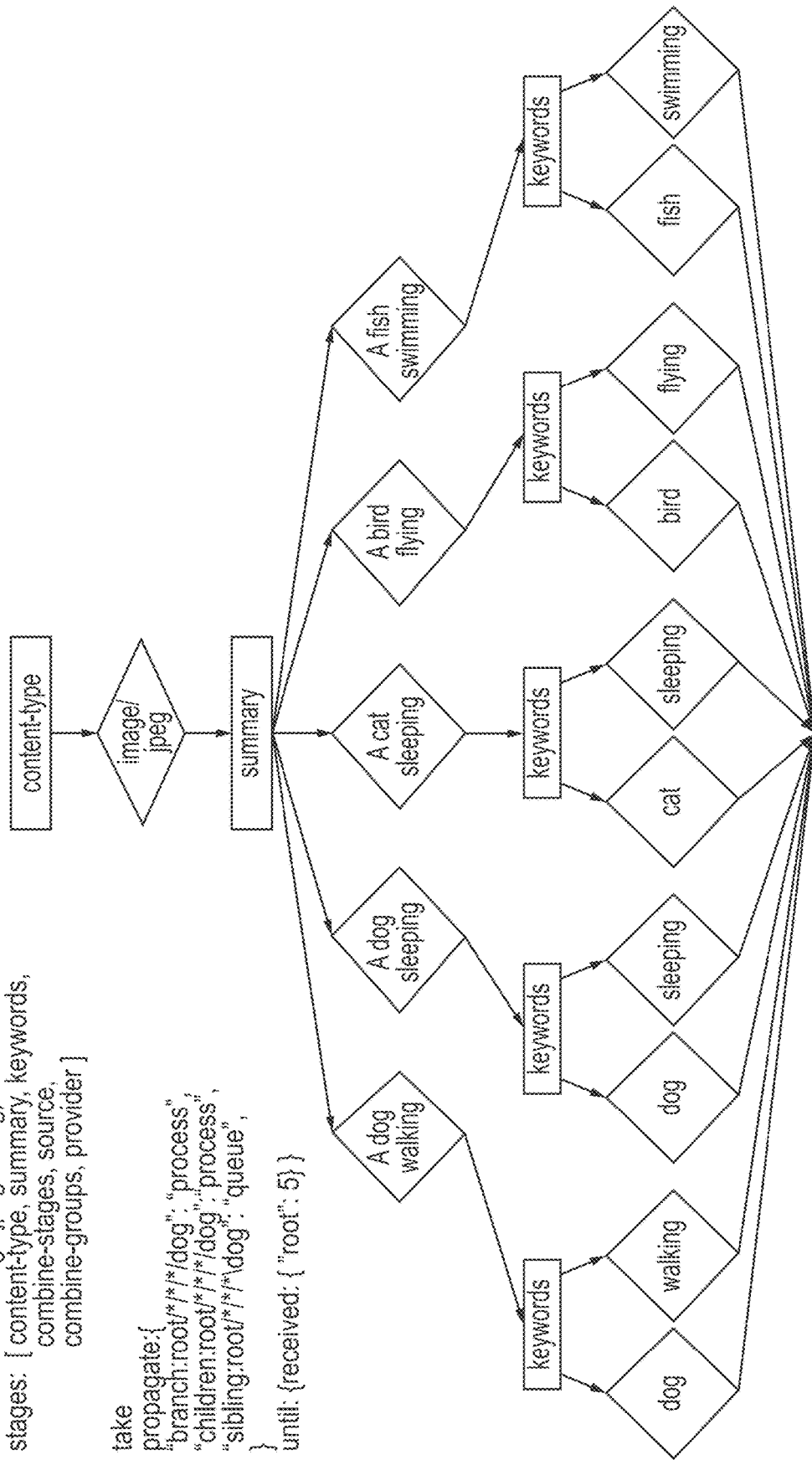
FIG. 3B is a diagram that illustrates outputs generated as the result of a create operation and a take operation according to one embodiment of the present invention.
Figure 3B:
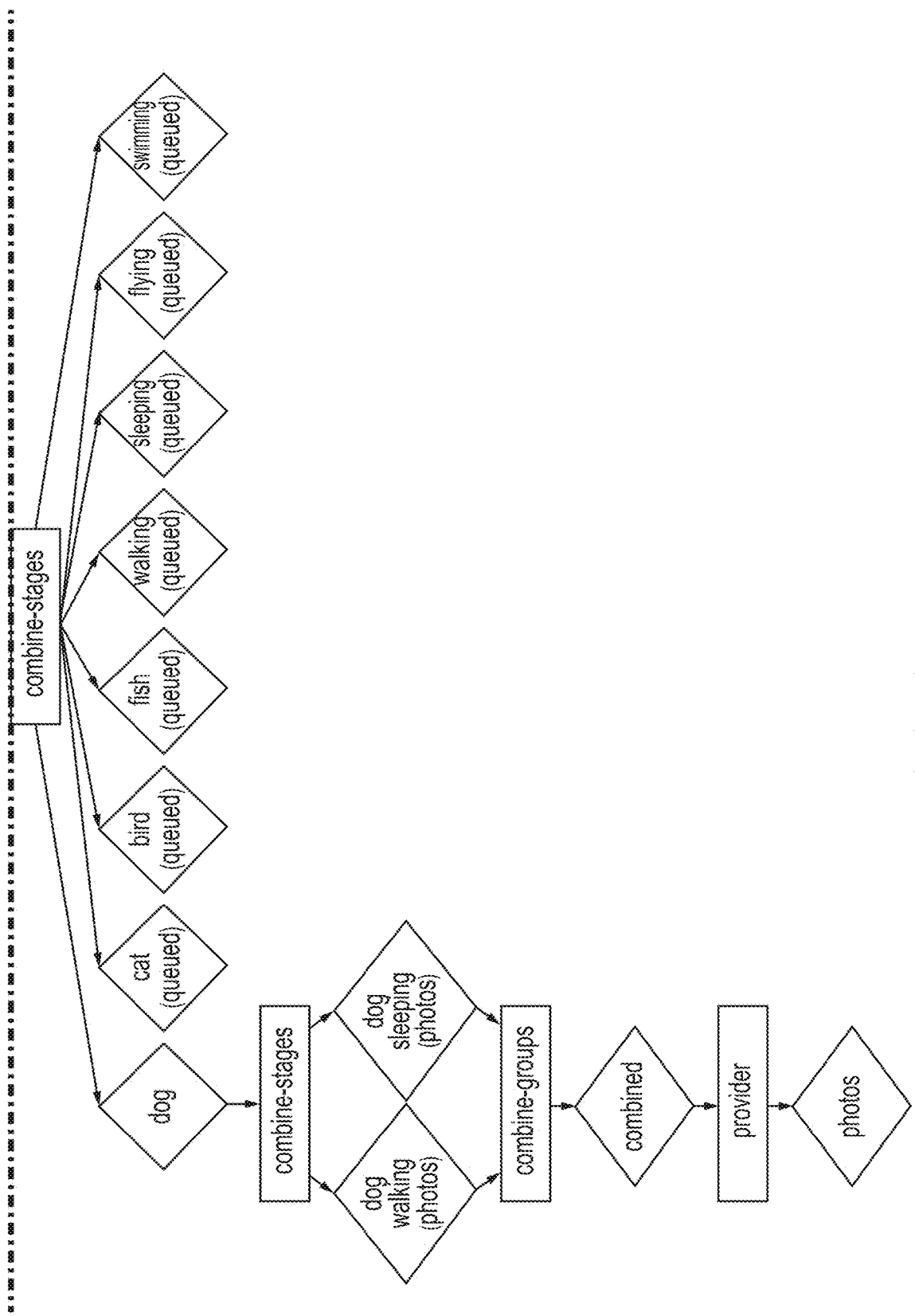

Referring to FIG. 3B, a diagram is shown which illustrates the effect of applying a particular create operation and a particular take operation, namely:

- create:
  - include: "root/image/jpeg"/*/dog
  - stages: [ content-type, summary, keywords, combine-stages, source, combine-groups, provider]
- take
  - propagate: { "branch:root/*/*/dog": "process", "children:root/*/*/dog": "process", "sibling:root/*/*/dog": "queue", }
  - until: { received: {"root": 5 } }

According to this combination of create and take operation, any sibling of the "combine-stages: dog" stage will perform the "queue" propagate operation; the ancestors of the "combine-stages: dog" stage will perform the "propagate" propagate operation; and the "until" parameter results in 5 items being taken by the resource iterator. Note that the resource iterator changes the allocation because the "include" parameter specifies "image/jpeg" as the first stage, which results in only resources from the "photos" resource provider being enumerated.

FIGS. 1A-1E are hybrid diagrams that combine elements of dataflow diagrams and a process flowcharts to represent the staged querying process of embodiments of the present invention. This hybrid approach allows for a comprehensive visualization of both the flow of data and the sequence of operations in the system. FIGS. 1A-1E are organized in a way that corresponds to the elements of claim 1. More specifically, each section represents a stage or operation in the querying process, showing both the flow of data between stages and the processing that occurs within each stage.

For example, FIG. 1A depicts the initial "create query" step, which includes the specification of stage types. The progression through FIGS. 1B-1E illustrates the flow of data from the resource iterator through various stages of processing and grouping. The use of nested boxes and arrows helps to visualize the hierarchical nature of the stage graph as it is constructed through the querying process.

FIG. 1A shows a create query operation 102, which is responsible for receiving and setting up the query parameters. Within the create query operation 102, a plurality of stage types 104 is specified. In the example shown in FIG. 1A, three stage types are depicted: S1, S2, and S3. In practice, there may be any number of stage types. A query processing module may receive a create query command that includes or otherwise specifies the plurality of stage types in a first specified order. Each of the stage types 104 may include or otherwise specify its own corresponding:

processing method: This method is specific to each stage type and is used for processing stage items. The processing method defines how input items are transformed or analyzed within particular stage having the stage type.

grouping method: This method, also specific to each stage type, determines the groups that are generated, and how the processed items are organized or categorized within the stage having that particular stage type. The grouping method is used to create the hierarchical structure that forms the basis of the stage graph.

The order in which the stage types 104 are specified in the create query operation 102 is significant, as it determines the sequence of processing and grouping operations that will be applied to the input items as they flow through the staged query system. By setting up this structure of ordered stage types, each with its own processing and grouping methods, the create query operation lays the foundation for the subsequent steps in the staged querying process.

Different instances of the create query operation 102 may include different stage types 104, which may vary in any of the ways disclosed herein. Embodiments of the present invention may receive such different instances of the create query operation 102 and execute each such instance in any of the ways disclosed herein. Executing an instance of the create query operation 102 may include performing any of the actions disclosed herein in connection with a "create" command, such as initializing the stage graph, setting up initial criteria for the resource iterator, setting up options for stage input queues, and initiating preliminary communication with aggregated resource providers.

Figure 1B:
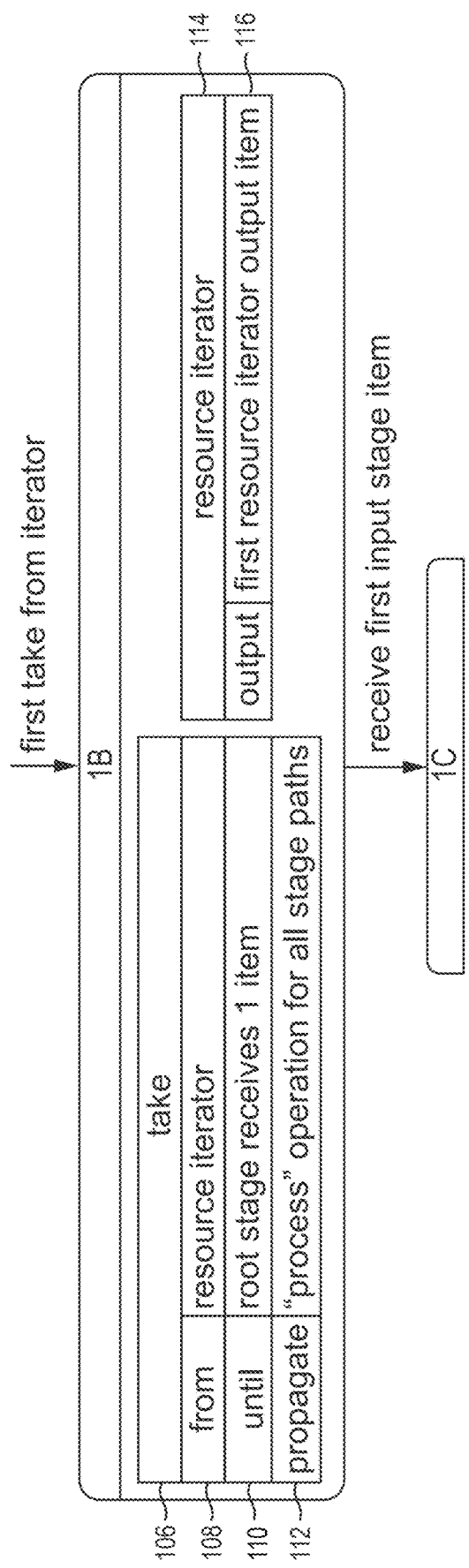

FIG. 1B illustrates the execution of a first take command 106. This figure depicts the process of retrieving and processing the initial set of stage items from a resource iterator 114. The take command 106, as shown in FIG. 1B, specifies two key elements:
- A first from source 108: This is the source from which the system will retrieve stage items. In this case, the first from source 108 is the resource iterator 114, which initially outputs a first stage item.
- A first until condition 110: This condition determines when the take command 106 should stop executing. It acts as a termination criterion for the retrieval process.

The execution of the first take command 106 proceeds as follows. The system begins retrieving stage items from the first resource iterator 114, one output item 116 at a time. Each output stage item 116 is associated with a corresponding resource. Different instances of the output stage item 116 may be associated with the same or different resources. This retrieval process continues until the first until condition 110 is satisfied. The condition 110 may be based on various criteria, such as a specific number of items retrieved, a timeout, or some other custom logic.

As a result of this process, the system receives a first plurality of input stage items 118 from the first resource iterator 114. These input stage items 118 form the initial dataset that will be processed by subsequent stages in the query.

The take command 106 may also specify a propagate operation 112, although in the example illustrated in FIG. 1B, this propagate operation 112 is implicit and assumed to be a "process" propagate operation. This "process" propagate operation indicates that the stage items should be fully processed by the subsequent stages in the query. Alternatively, however, the propagate operation 112 may be any of the types of propagate operations disclosed herein. Different instances of the take command 106 may specify the same or different propagate operations.

Figure 1C:
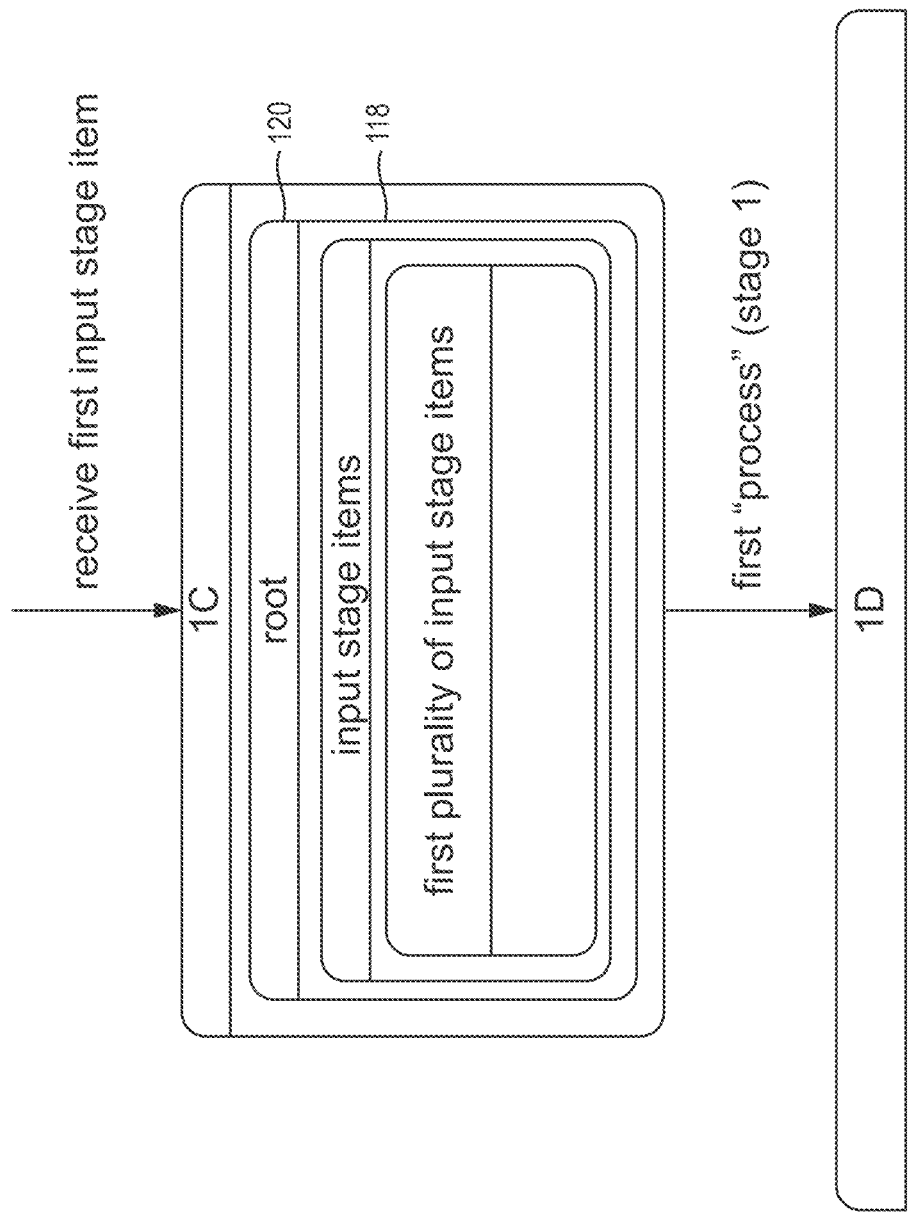

FIG. 1C illustrates providing the first plurality of input stage items 118 to a first stage, also referred to as the root stage 120, after completion of the take command 106. This first stage 120 has a root group ID and is the initial stage in the specified order of the stage types 104.

As shown in FIG. 1C, the first plurality of input stage items 118, received from the resource iterator 114 in the previous step, are provided to the first stage 120. This first stage 120 is assigned a root group ID, which is a unique identifier distinguishing it from subsequent stages and serving as the starting point for the hierarchical organization of resources in the staged query system.

The first stage 120 corresponds to the first stage type (S1) in the plurality of stage types 104 specified in the create query operation 102. This alignment ensures that the processing and grouping methods defined for this stage type will be applied to the first plurality of input stage items 118.

By providing the first plurality of input stage items 118 to this root-level stage 120, the system initiates the construction of the stage graph. This graph structure is fundamental to the staged query system, as it will evolve through subsequent stages' processing and grouping, enabling a flexible and hierarchical organization of resources.

Figure 1D:
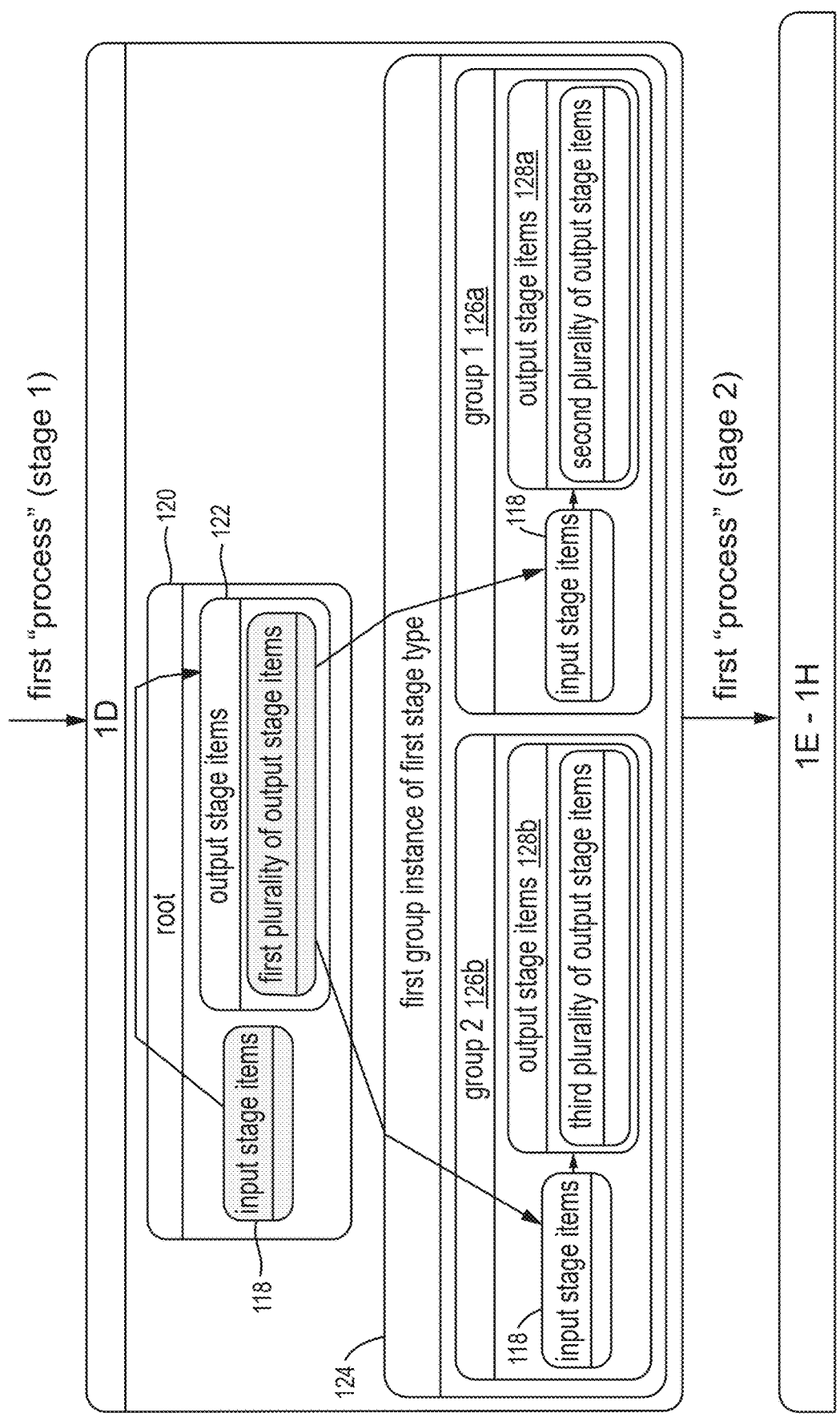

FIG. 1D illustrates processing the first plurality of input stage items to produce output stage items 122 and groups 124. This step transforms the input data and organizes it into a structured format for further processing.

In the step shown in FIG. 1D, the first stage 120 processes the first plurality of input stage items 118 to produce a first plurality of output stage items 122. This processing is performed as part of executing the first propagate operation 112. As described above, the first propagate operation 112 may be of a "process" type.

The step shown in FIG. 1D may include receiving the first plurality of input stage items 118 by the first stage 120.

The step shown in FIG. 1D may include processing the first plurality of input stage items 118 by the first stage 120 to produce the first plurality of output stage items 122. The processing method that used is specified by the first stage type (S1) that was defined in the create query operation 102. The processing method may involve various operations such as any one or more of filtering, transforming, or analyzing the first plurality of input stage items 118 to generate the first plurality of output stage items 122.

The step shown in FIG. 1D may include grouping the first plurality of output stage items 122 by the first stage 120, using the grouping method corresponding to the first stage 120, to produce a first plurality of groups 124. In the example of FIG. 1D, the first plurality of groups 124 includes a first group 126a and a second group 126b.

This grouping process may include three sub-steps:
- Creating the first plurality of groups 124: In this sub-step, the first stage 120 establishes the structure for the first plurality of groups 124. This involves initializing the group containers that will hold the output stage items 122. The creation of these groups is based on the grouping method specified by the first stage type (S1).
- Assigning, to each group in the first plurality of groups 124, a corresponding group ID: Once the first plurality of groups 124 is created, each group within the first plurality of groups 124 is assigned a unique group ID. This group ID serves as a distinct identifier for each group, allowing for efficient referencing and management of the groups within the stage graph structure.
- Assigning, to each group in the first plurality of groups 124, corresponding output stage items from the first plurality of output stage items 122: The first stage 120 distributes the output stage items 122 among the created groups 124. This assignment is performed based on the criteria defined in the grouping method of the first stage type (S1). The result is that each group, including the first group 126a and the second group 126b, contains a subset of the output stage items 122 that share common characteristics or meet specific grouping criteria. In the example of FIG. 1D, the first group 126a includes output stage items 128a, which are a first subset of the input stage items 118, and the second group 126b includes output stage items 128b, which are a second subset of the input stage items 118.

The output stage items 128*a* and the output stage items 128*b* may differ from each other in any of a variety of ways.

The staged query system's approach to grouping output stage items, rather than input stage items, offers several key advantages and distinctions from conventional file systems and query systems. For example, because the system groups output stage items, an associated resource may end up in multiple groups (e.g., in both group 126*a* and 126*b*). This allows for more flexible and nuanced categorization of resources, as a single resource can belong to multiple logical groups simultaneously.

The output stage items in the groups 126*a-b* may have been transformed or generated during the processing step, and may only be associated with the input stage items 118 via mappings. This means that the grouped items can represent derived or processed data, rather than just the original input data. Furthermore, the mappings between input and output stage items allow for the representation of complex relationships and transformations that go beyond simple one-to-one correspondences.

These features contrast sharply with conventional file systems and query systems, which typically map input items directly into respective groups. For example, conventional systems often limit resources to a single category or folder, whereas the staged query system allows for multi-faceted categorization. Furthermore, traditional systems usually maintain a direct correspondence between input and output, without the capability for complex transformations or derivations during the grouping process. By grouping output stage items that may have been transformed or generated, and allowing for complex mappings to input items, the staged query system provides a more flexible and powerful approach to data organization and querying. This enables more sophisticated analysis and organization of resources, going beyond the limitations of traditional file and folder hierarchies or simple query result groupings.

Figure 1E:
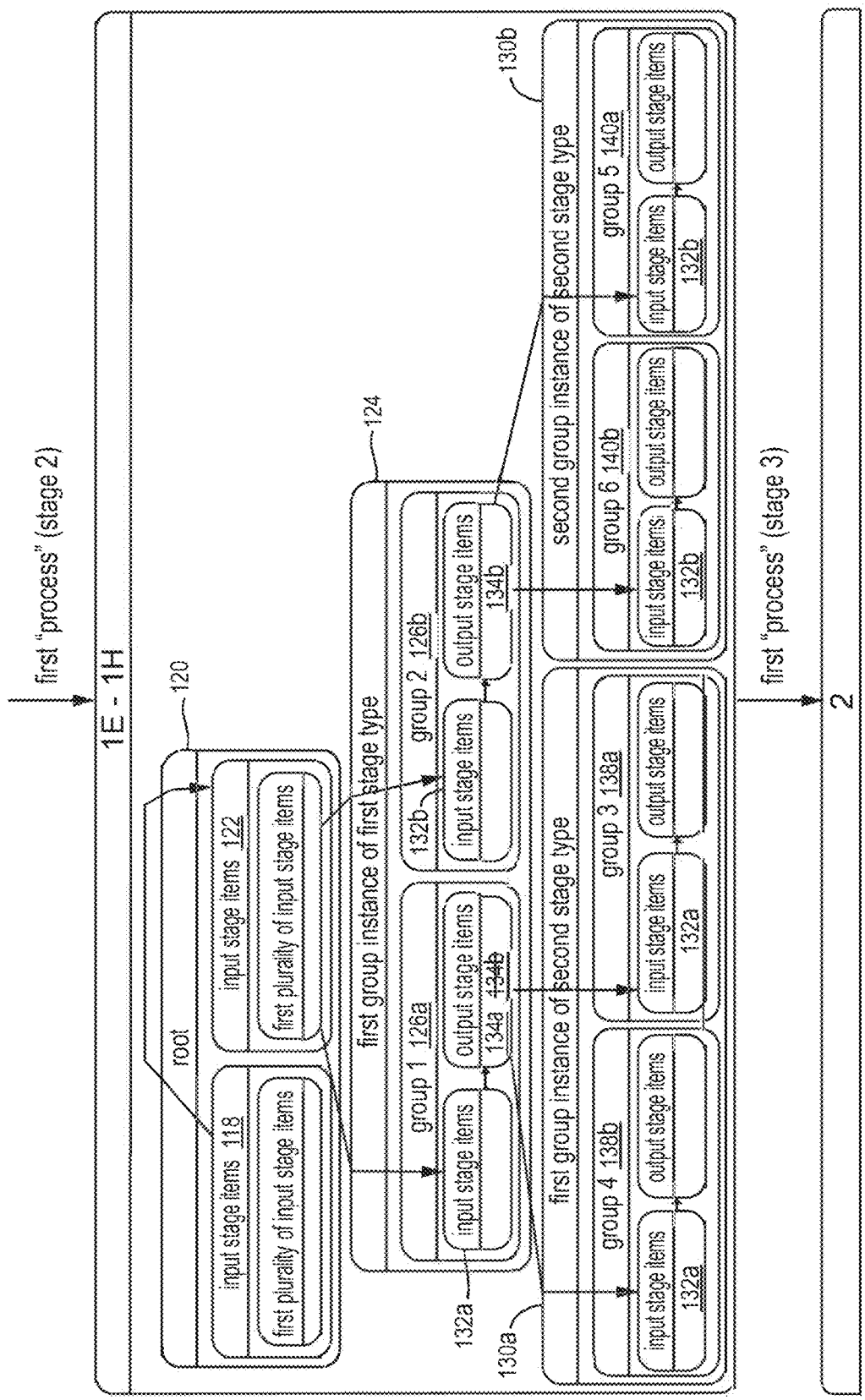

As shown in FIG. 1E, the system may provide the first group 126*a* to a first instance 130*a* of a second stage. This step moves the grouped data from the first stage to the next stage for further processing.

In this step, the first group 126*a*, which was created and populated with output stage items 128*a* during the grouping process in the first stage 120, is provided to a first instance 130*a* of a second stage. The second stage corresponds to the second stage type (S2) in the first specified order of the plurality of stage types 104 that was defined in the create query operation 102.

This transfer of grouped data from one stage to the next allows for sequential processing and transformation of data through multiple stages. Each stage in the sequence can apply its own processing and grouping methods, building upon the results of the previous stage. The use of stage instances, such as the first instance 130*a* of the second stage, allows for parallel processing of different groups.

FIG. 1E also illustrates providing the second group 126*b* to a second instance 130*b* of the second stage. This step may be performed in parallel with providing the first group 126*a* to the first instance 130*a* of the second stage.

In this step, the second group 126*b*, which was created and populated with output stage items 128*b* during the grouping process in the first stage 120, is provided to a second instance 130*b* of the second stage. Like the first instance 130*a*, this second instance 130*b* corresponds to the second stage type (S2) in the first specified order of the plurality of stage types 104 that was defined in the create query operation 102. By providing both the first group 126*a* and the second group 126*b* to separate instances of the second stage (130*a* and 130*b* respectively), the system prepares for processing (potentially concurrently) of these groups in the next phase of the query.

FIG. 1E also illustrates processing the first group 126*a* by the first instance 130*a* of the second stage as part of a second propagate operation. In this step, the first instance 130*a* of the second stage processes the first group 126*a*. This processing is performed as part of executing the second propagate operation, which may be of the "process" type, similar to the first propagate operation in the first stage. The processing method used in this step is specified by the second stage type (S2) that was defined in the create query operation 102. This allows for a different set of processing rules and criteria to be applied to the data as it moves through the staged query system.

The processing of the first group 126*a* by the first instance of the second stage may be broken down into three substeps:

Receiving the first group as a second plurality of input stage items 132*a*: In this substep, the first instance 130*a* of the second stage receives the first group 126*a* as a second plurality of input stage items 132. This reception marks the transition of data from the output of the first stage to the input of the second stage, enabling the continuation of the staged query process.

Processing to produce a second plurality of output stage items 134*a*: Once the second plurality of input stage items 132*a* is received, the first instance 130*a* of the second stage processes these items 132*a* using the processing method specified by the second stage type (S2). This processing transforms the input stage items 132*a* into a second plurality of output stage items 134*a*, applying the specific logic and rules defined for the second stage type in the create query operation. This step allows for further refinement and transformation of the data as it progresses through the staged query system.

Grouping the second plurality of output stage items 134*a*: In the final substep, the first instance 130*a* of the second stage groups the second plurality of output stage items 134*a* using the grouping method corresponding to the second stage. This grouping operation produces a second plurality of groups 136*a*, which includes at least a third group 138*a* and a fourth group 138*b*. The grouping process organizes the output stage items 134*a* based on criteria specified in the grouping method of the second stage type, further structuring the data for subsequent processing or analysis.

These substeps collectively demonstrate the recursive nature of the staged query system, where each stage performs similar operations (receiving, processing, and grouping) on its input, building upon the results of the previous stage and preparing the data for further processing in subsequent stages.

The grouping step may be further broken down into three sub-steps:

Creating the second plurality of groups 136*a*: In this sub-step, the first instance 130*a* of the second stage establishes the structure for the second plurality of groups 136*a*. This involves initializing the group containers that will hold the output stage items 134*a*. The creation of these groups 136*a* is based on the grouping method specified by the second stage type (S2).

Assigning, to each group in the second plurality of groups 136*a*, a corresponding group ID: Once the groups are created, each group within the second plurality of groups 136*a* is assigned a unique group ID. This group ID serves as a distinct identifier for each group, allowing for efficient referencing and management of the groups within the stage graph structure. The assignment of group IDs is crucial for maintaining the hierarchical organization of the processed data and enabling further operations in subsequent stages.

Assigning, to each group in the second plurality of groups 136a, corresponding output stage items from the second plurality of output stage items 134a: In this final sub-step, the first instance 130a of the second stage distributes the output stage items 134a among the created groups. Each group in the second plurality of groups 136a is populated with the corresponding output stage items from the second plurality of output stage items 134a. This assignment is performed based on the criteria defined in the grouping method of the second stage type (S2). The result is that each group, including the third group 138a and the fourth group 138b, contains a subset of the output stage items 134a that share common characteristics or meet specific grouping criteria.

FIG. 1E also illustrates processing the second group 126b by the second instance 130b of the second stage as part of a third propagate operation. In this step, the second instance 130b of the second stage processes the second group 126b. This processing is performed as part of executing the third propagate operation, which may be of the "process" type, similar to the first and second propagate operations. The processing method used in this step is specified by the second stage type (S2) that was defined in the create query operation 102. This allows for a different set of processing rules and criteria to be applied to the data as it moves through the staged query system.

The processing of the second group 126b by the second instance of the second stage may be broken down into three substeps:

Receiving the second group as a third plurality of input stage items 132b: In this substep, the second instance 130b of the second stage receives the second group 126b as a third plurality of input stage items 132b. This reception marks the transition of data from the output of the first stage to the input of the second stage, enabling the continuation of the staged query process.

Processing to produce a third plurality of output stage items 134b: Once the third plurality of input stage items 132b is received, the second instance 130b of the second stage processes these items 132b using the processing method specified by the second stage type (S2). This processing transforms the input stage items 132b into a third plurality of output stage items 134b, applying the specific logic and rules defined for the second stage type in the create query operation. This step allows for further refinement and transformation of the data as it progresses through the staged query system.

Grouping the third plurality of output stage items 134b: In the final substep, the second instance 130b of the second stage groups the third plurality of output stage items 134b using the grouping method corresponding to the second stage. This grouping operation produces a third plurality of groups 136b, which includes at least a fifth group 140a and a sixth group 140b. The grouping process organizes the output stage items 134b based on criteria specified in the grouping method of the second stage type, further structuring the data for subsequent processing or analysis.

These substeps collectively demonstrate the recursive nature of the staged query system, where each stage performs similar operations (receiving, processing, and grouping) on its input, building upon the results of the previous stage and preparing the data for further processing in subsequent stages.

The grouping step may be further broken down into three sub-steps:

Creating the third plurality of groups 136b: In this sub-step, the second instance 130b of the second stage establishes the structure for the third plurality of groups 136b. This involves initializing the group containers that will hold the output stage items 134b. The creation of these groups 136b is based on the grouping method specified by the second stage type (S2).

Assigning, to each group in the third plurality of groups 136b, a corresponding group ID: Once the groups are created, each group within the third plurality of groups 136b is assigned a unique group ID. This group ID serves as a distinct identifier for each group, allowing for efficient referencing and management of the groups within the stage graph structure. The assignment of group IDs is crucial for maintaining the hierarchical organization of the processed data and enabling further operations in subsequent stages.

Assigning, to each group in the third plurality of groups 136b, corresponding output stage items from the third plurality of output stage items 134b: In this final sub-step, the second instance 130b of the second stage distributes the output stage items 134b among the created groups. Each group in the third plurality of groups 136b is populated with the corresponding output stage items from the third plurality of output stage items 134b. This assignment is performed based on the criteria defined in the grouping method of the second stage type (S2). The result is that each group, including the fifth group 140a and the sixth group 140b, contains a subset of the output stage items 134b that share common characteristics or meet specific grouping criteria.

In the staged query system, corresponding groups in "sibling" stages share the same group ID, which establishes an association between them. This feature is an important aspect of the system's hierarchical organization and allows for efficient management of related data across parallel processing instances. For example, group 138a in the first instance 130a of the second stage and fifth group 140a in the second instance 130b of the second stage may share the same group ID. Similarly, groups 138b and 140b may also share the group ID, which may be different from the group ID that is shared by groups 138a and 140a.

This shared group ID serves several purposes. For example, it maintains consistency in the logical structure of the data across parallel processing paths. It also enables efficient referencing and management of related groups within the stage graph structure. Furthermore, it facilitates the aggregation or comparison of results from parallel processing instances in subsequent stages or during final query result compilation. By maintaining this association through shared group IDs, the staged query system can effectively handle complex data relationships and hierarchies, even when processing occurs in parallel across multiple instances of the same stage type. This approach contributes to the system's ability to perform sophisticated data transformations and organizations that go beyond traditional query systems.

Figure 2:
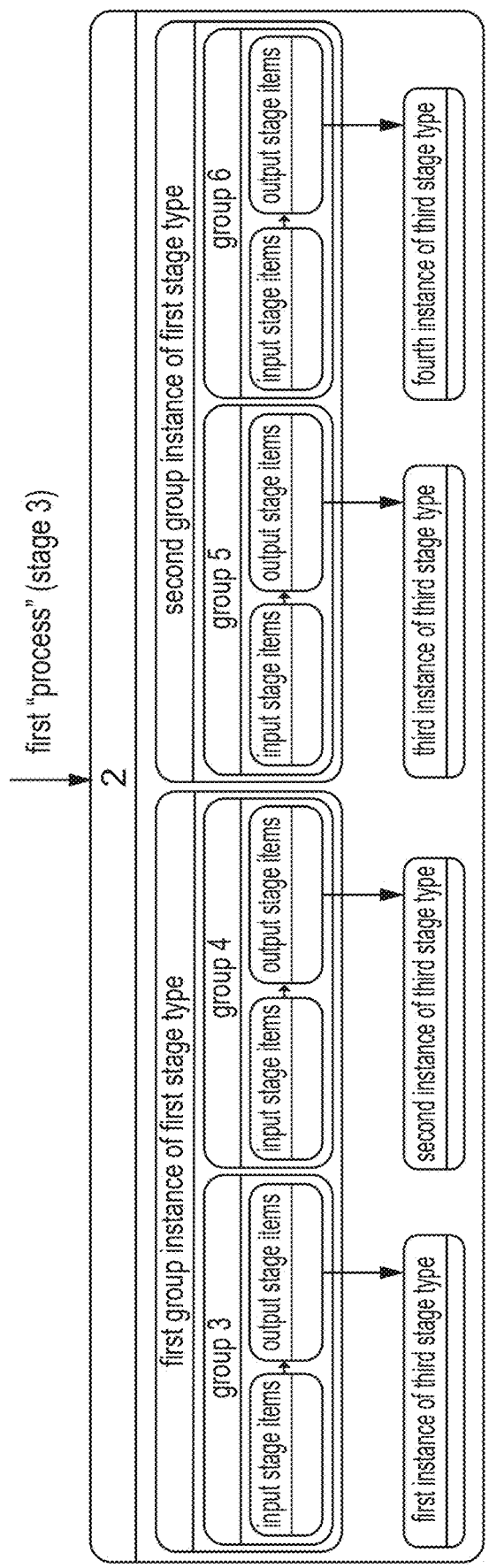
FIG. 2 is a diagram that represents an additional aspect of the staged querying process of FIGS. 1A-1E according to one embodiment of the present invention.

FIG. 2 extends the stage graph structure illustrated in FIGS. 1A-1E by introducing a third stage, which corresponds to the third stage type in the first specified order of the plurality of stage types defined in the create query operation. More specifically, the grouped output stage items from the second stage are provided to multiple instances of a third stage, by performing the following steps:

- The third plurality of grouped output stage items (which includes the third group 138a and the fourth group 138b) produced by the first instance 130a of the second stage is provided to a first instance of the third stage.
- The fourth plurality of grouped output stage items (which includes the fifth group 140a and the sixth group 140b) produced by the second instance 130b of the second stage is provided to a second instance of the third stage.
- The fifth plurality of grouped output stage items (which is part of the third plurality of groups 136a) is provided to a third instance of the third stage.
- The sixth plurality of grouped stage items (which is part of the third plurality of groups 136b) is provided to a fourth instance of the third stage.

This process demonstrates the continued expansion of the stage graph structure, where each group produced by the second stage becomes an input for a separate instance of the third stage. This approach allows for parallel processing of data as it flows through the staged query system, enabling efficient handling of complex queries and large datasets. The use of multiple instances of the third stage (first, second, third, and fourth instances) highlights the system's ability to distribute workload across different processing units, potentially improving performance and scalability.

Although not shown in FIG. 2, each instance of the third stage may perform its own processing and grouping operations, similar to what was described for the second stage, but using the processing and grouping methods specified by the third stage type, which may be the same as or different from the processing and grouping methods of any of the previous stages.

The system may receive a list of stage paths, where each stage path is associated with a corresponding propagate operation selected from a set of propagate operations. This set of propagate operations may include any two of more of the following: "process," "discard," "group-discard", and "queue.". The "process" propagate operation indicates that the stage should fully process the input items, transforming them into output stage items and grouping them, as demonstrated in the processing steps of the first and second stages in FIGS. 1A-1E. The "discard" operation discards input items for a specific stage path without processing them. The "group-discard" operation involves grouping the input items but then discarding the individual items, retaining only the group structure. The "queue" operation involves placing the input items in a queue for later processing, rather than being processed immediately.

The propagate operation that is associated with any particular stage path may, for example, be an explicit propagate operation or an implicit propagate operation. An explicit propagate operate is associated explicitly with a corresponding stage path and explicitly defines how data should be propagated through that stage paths. An implicit propagate operation is one that is not explicitly specified for a particular stage path, but that instead is identified as being associated with that stage path implicitly. For example, an implicit propagate operation may be a default propagate operation, or may be inherited from a previous stage.

Various ways in which grouped output stage items may be processed by embodiments of the present invention will now be described in relation to processing of grouped output stage items by a first instance of the third stage, by way of example. Such description, however, is equally applicable to processing that may be performed by any stage in the system.

Processing of the third plurality of grouped stage items by the first instance of the third stage may include the following steps:

- Receiving the third plurality of grouped output stage items as a fourth plurality of input stage items: This step continues the pattern established in previous stages, where output from one stage becomes input for the next, as seen in the transition from the first stage to the second stage instances in FIG. 1E.
- Identifying the stage path of the fourth plurality of input stage items: This step involves determining the specific path these items have taken through the stage graph, which could include information about their origin in the first stage and processing in the second stage instances.
- Identifying the propagate operation corresponding to the identified stage path: This operation may, for example, be one of "process," "discard," "group-discard," and "queue" (or any subset thereof).
- Performing the identified propagate operation on the fourth plurality of input stage items. Depending on the identified operation, this may, for example, involve fully processing the items (similar to the processing shown in FIG. 1E for previous stages), discarding them, group-discarding (retaining only group structure), or queueing them for later processing.

The above description demonstrates how the propagate operations are applied in practice, allowing for dynamic control over data flow through the stage graph based on the path taken by the data. It extends the functionality shown in FIGS. 1A-1E and FIG. 2 by introducing a mechanism for selective processing at each stage.

The list of stage paths (with their associated propagate operations) may be received in any of a variety of ways. For example, the list of stage paths (with their associated propagate operations) may be received as part of the initial query (e.g., the "create" operation). This embodiment allows for a comprehensive definition of how data should flow through the entire stage graph, from the root stage through to the third stage instances shown in FIG. 2.

Alternatively, for example, the list of stage paths may be included in the first take command. This approach allows for more dynamic control, enabling the adjustment of propagate operations based on initial results or changing conditions during query execution. This flexibility may be particularly useful when, for example, dealing with complex stage graphs like the one illustrated in FIG. 2, where different propagate operations might be desired for different branches of the graph.

The staged query system may support various types of propagate operations that control how data flows through the stage graph. These propagate operations provide flexibility and efficiency in query execution, allowing for sophisticated data processing strategies. While the system may define several standard propagate operations, it is important to note that these operations may be implemented in a variety of ways, depending on the specific requirements of the query and the underlying system architecture. The following description describes certain particular examples of how different types of propagate operations may be implemented within the staged query system.

The "discard" propagate operation may be implemented within the staged query system as follows. This implementation demonstrates a specific way to handle data that is not needed for further processing, potentially optimizing resource usage in complex query scenarios. Although the following description refers to processing performed by the first instance of the third stage on the third plurality of grouped output stage items as part of the fourth propagate operation as a particular example, the same description applies to processing performed by any instance of any stage on any grouped output stage items as part of any propagate operation.

The third stage may perform processing on the third plurality of grouped output stage items, as part of a fourth propagate operation of the "discard" type. The implementation of the "discard" propagate operation may include the following steps:

Receiving the input: The third plurality of grouped output stage items is received as a fourth plurality of input stage items. This step maintains consistency with the data flow pattern established in previous stages, where output from one stage becomes input for the next.

Discarding the input: After receiving the fourth plurality of grouped input stage items, they are discarded. This action effectively terminates the processing of these items at this stage, preventing them from progressing further through the stage graph.

This implementation of the "discard" propagate operation allows the staged query system to efficiently handle scenarios where certain data paths or branches in the stage graph are determined to be unnecessary for the final query result. By discarding input items at a specific stage, the system can reduce computational overhead and memory usage in subsequent stages, potentially improving overall query performance.

The "discard" operation can be particularly useful in complex queries where early stages might generate a wide range of potential data paths, but only a subset of these paths are relevant to the final result. By selectively discarding irrelevant data early in the query execution, the system can focus its resources on processing the most pertinent information. It is important to note that, while this implementation discards the input items immediately after receiving them, variations of the "discard" operation may be designed to perform some lightweight processing or logging before discarding, depending on the specific requirements of the query system.

The "queue" propagate operation may be implemented within the staged query system as follows. This implementation demonstrates a specific way to handle data that needs to be processed later, allowing for more flexible resource management and query execution strategies.

Although the following description refers to processing performed by the first instance of the third stage on the third plurality of grouped output stage items as part of the fourth propagate operation as a particular example, the same description applies to processing performed by any instance of any stage on any grouped output stage items as part of any propagate operation.

The third stage may perform processing on the third plurality of grouped output stage items, as part of a fourth propagate operation of the "queue" type. The implementation of the "queue" propagate operation may include the following steps:

Receiving the input: The third plurality of grouped output stage items is received as a fourth plurality of input stage items. This step maintains consistency with the data flow pattern established in previous stages, where output from one stage becomes input for the next.

Queueing the input: After receiving the fourth plurality of grouped input stage items, they are placed into a first queue. This action effectively defers the processing of these items, allowing them to be handled at a later time or under specific conditions.

This implementation of the "queue" propagate operation enables the staged query system to manage complex data flows where immediate processing of all items may not be optimal or desired. By queueing input items at a specific stage, the system can control the rate of data processing, balance workloads across different stages, or implement priority-based processing schemes.

The "queue" operation can be particularly useful in scenarios where processing resources need to be managed carefully to prevent bottlenecks, certain data paths require additional input or conditions before they can be processed, or the query system needs to implement a form of backpressure to handle high volumes of data efficiently. By providing a mechanism to queue data for later processing, this implementation allows for more sophisticated query execution strategies that can adapt to varying workloads and system conditions.

It is important to note that while this implementation places the input items into a queue immediately after receiving them, variations of the "queue" operation may be designed to perform some preprocessing or prioritization before queueing, depending on the specific requirements of the query system.

Building upon the "queue" propagate operation described earlier, the staged query system may implement a mechanism to process the queued items as follows. The system may execute a second take command that specifies: (1) a second from source to take from, which comprises the first queue created by the "queue" propagate operation in the previous stage; and (2) a second until condition that determines when to stop taking items from the queue. Optionally, the take command may also specify a specific item to take from the queue.

The execution of this second take command may include receiving stage items from the first queue. In particular, the system may receive individual stage items from the first queue until the second until condition is satisfied. This process results in taking a second plurality of stage items from the first queue.

This implementation allows for flexible processing of queued items, enabling the staged query system to manage complex data flows where deferred processing is beneficial. By providing a mechanism to selectively retrieve and process items from a queue created in a previous stage, the system can implement sophisticated query execution strategies that adapt to varying workloads and system conditions.

The ability to execute a second take command on a queue can be particularly useful in scenarios such as implementing priority-based processing of queued items, balancing workloads across different stages of the query, or applying additional filtering or selection criteria to queued items before further processing.

The "group discard" propagate operation may be implemented within the staged query system as follows. This implementation demonstrates a specific way to handle data where the group structure needs to be retained but individual items can be discarded, allowing for more efficient resource management and query execution strategies.

Although the following description refers to processing performed by the first instance of the third stage on the third plurality of grouped output stage items as part of the fourth propagate operation as a particular example, the same description applies to processing performed by any instance of any stage on any grouped output stage items as part of any propagate operation.

The third stage may perform processing on the third plurality of grouped output stage items, as part of a fourth propagate operation of the "group discard" type. The implementation of the "group discard" propagate operation may include the following steps:

Receiving the input: The third plurality of grouped output stage items is received as a fourth plurality of input stage items. This step maintains consistency with the data flow pattern established in previous stages, where output from one stage becomes input for the next.

Processing the input: The first instance of the third stage processes the fourth plurality of input stage items to produce a fourth plurality of output stage items.

Generating the groups: As previously described, generating the groups separately from assigning the output stage items to groups has a variety of benefits.

Grouping the output: The first instance of the third stage groups the fourth plurality of output stage items using the grouping method corresponding to the first instance of the third stage. This grouping produces a fourth plurality of groups, which includes at least a seventh group and an eighth group.

Creating and assigning group IDs: The system creates the fourth plurality of groups and assigns a corresponding group ID to each group in the fourth plurality of groups.

Discarding items and retaining groups: The fourth plurality of output stage items is discarded, while the fourth plurality of groups is retained.

This implementation of the "group discard" propagate operation enables the staged query system to manage complex data flows where the group structure is important for subsequent stages and results of subsequent queries, but the individual items within those groups are not needed. By discarding the output stage items while retaining the group structure, the system can reduce memory usage and potentially improve query performance in scenarios where only the group information is relevant.

The "group discard" operation can be particularly useful in scenarios where aggregate information about groups is needed, but individual item details are not required for further processing; where the query system needs to maintain a hierarchical structure without the overhead of storing all individual items; or where subsequent stages in the query only require information about the groups themselves, rather than their contents. By providing a mechanism to retain group structure while discarding individual items, this implementation allows for more sophisticated query execution strategies that can optimize resource utilization while preserving necessary structural information.

It is important to note that while this implementation discards the output stage items after grouping, variations of the "group discard" operation may be designed to perform some additional processing or analysis on the groups before discarding the individual items, depending on the specific requirements of the query system.

The staged query system may implement a mechanism for executing multiple take commands on the resource iterator as follows. This implementation demonstrates how the system can retrieve additional input stage items from the original data source, allowing for more flexible and dynamic query execution.

Although the following description refers to executing a second take command on the first resource iterator as a particular example, the same description applies to executing any subsequent take command on the resource iterator after the initial take command has been executed. The system may execute a second take command that specifies:

A second from source to take from, which comprises the first resource iterator. This indicates that the system is returning to the original data source for additional input.

A second until condition that determines when to stop taking items from the resource iterator.

The implementation of this second take command may include receiving a fourth plurality of input stage items from the first resource iterator, such as by receiving, from the first resource iterator, a stage item associated with a resource, until the second until condition is satisfied. This process results in receiving the fourth plurality of input stage items from the first resource iterator.

This implementation of the second take command on the resource iterator enables the staged query system to manage complex data flows where additional input from the original data source is necessary or beneficial. By allowing subsequent take commands to retrieve more items from the resource iterator, the system can implement sophisticated query execution strategies that adapt to intermediate results or changing conditions during query execution.

It is important to note that while this implementation describes a straightforward retrieval of additional items from the resource iterator, variations of the second take command may be designed to implement more complex selection criteria or processing logic when retrieving items, depending on the specific requirements of the query system. This could include filtering or transforming the items before they are passed to the stage graph for processing.

The staged query system may use any of a variety of methods to filter resources when receiving items from a resource iterator. These methods collectively aim to enhance the efficiency and flexibility of the query execution process by optimizing the selection of resources based on different criteria. The overall purpose of these filtering methods is to provide the staged query system with multiple approaches to refine and filter the input stage items before they enter the stage graph for processing. By implementing these filtering techniques, the system can reduce unnecessary data transfer and processing, potentially improving overall query performance and resource utilization.

The functionality of these various filtering methods differ in their interactions between the resource iterator and the resource provider. Each method outlines a specific approach for issuing a filter query to the resource provider, evaluating resources based on certain criteria, and selecting the appropriate resources to be included in the first plurality of input stage items.

The staged query system may implement a filtering method when receiving stage items from the resource iterator, which optimizes the selection of resources based on an "include stage path" (which may be one or more stage paths). This method enhances the efficiency of the query execution process by refining the input stage items before they enter the stage graph for processing. This filtering method may include the following steps:

Issuing a filter query: The system issues a filter query to the resource provider based on an include stage path. This include stage path specifies which stages or paths within the query structure should be considered when selecting resources.

Evaluating resources: Each resource from the resource provider is evaluated based on the include stage path. This evaluation process determines whether a given resource matches the criteria specified by the include stage path.

Selecting resources: Based on the evaluation results, the system selects resources to be included in the first plurality of input stage items. Only resources that meet the criteria specified by the include stage path are chosen for further processing.

This filtering method allows the staged query system to efficiently narrow down the set of resources that will be processed by the subsequent stages in the query. By applying this filtering at the resource iterator level, the system can reduce unnecessary data transfer and processing, potentially improving overall query performance and resource utilization.

The use of an include stage path as the filtering criterion provides flexibility in defining which resources should be considered for the query. This approach can be particularly useful in scenarios where only specific paths or stages within the query structure are relevant to the desired outcome, allowing the system to focus on processing only the most pertinent data.

The staged query system may implement an alternative filtering method when receiving stage items from the resource iterator, which enhances the flexibility and granularity of resource selection. This method expands upon the previous approach by considering multiple stage paths and their corresponding propagate operations. The key differences in this filtering method are:

Filter query criteria: Instead of using a single include stage path, the system issues a filter query based on a plurality of stage paths and their corresponding propagate operations. This allows for more complex and nuanced filtering criteria.

Resource evaluation: Each resource from the resource provider is evaluated based on the multiple stage paths and their associated propagate operations. This evaluation process considers how a resource would be processed and propagated through various paths in the stage graph.

Resource selection: The system selects resources for inclusion in the first plurality of input stage items based on this more comprehensive evaluation. This allows for a more refined selection process that takes into account the potential processing and propagation of resources through different paths in the query.

By incorporating multiple stage paths and propagate operations into the filtering process, this method provides the staged query system with greater control over resource selection. It allows the system to consider not just where a resource might be processed in the stage graph, but also how it would be handled at each stage. This can lead to more efficient query execution by ensuring that only the most relevant resources are selected for processing, based on a more detailed understanding of the query's structure and operations.

The staged query system may implement another alternative filtering method when receiving stage items from the resource iterator, which focuses on using the first until condition as the basis for filtering. This method provides a dynamic approach to resource selection based on the query's termination criteria. The key differences in this filtering method are:

Filter query criteria: Instead of using an include stage path or multiple stage paths, the system issues a filter query based on the first until condition specified in the take command. This allows the filtering process to align directly with the query's termination criteria.

Resource evaluation: Each resource from the resource provider is evaluated based on the first until condition. This evaluation process considers how a resource relates to the conditions that would cause the query to stop taking items.

Resource selection: The system selects resources for inclusion in the first plurality of input stage items based on this evaluation against the until condition. This allows for a more targeted selection process that takes into account the query's intended scope or limit.

By incorporating the first until condition into the filtering process, this method provides the staged query system with a way to dynamically adjust resource selection based on the query's runtime parameters. It allows the system to potentially optimize resource retrieval by considering the conditions under which the query will terminate. This can lead to more efficient query execution by ensuring that only resources relevant to the query's scope are selected for processing, potentially reducing unnecessary data transfer and processing.

The staged query system may implement an additional alternative filtering method when receiving stage items from the resource iterator, which focuses on using the plurality of stage types as the basis for filtering. This method provides a type-based approach to resource selection aligned with the overall structure of the query. The key differences in this filtering method are:

Filter query criteria: Instead of using an include stage path, multiple stage paths, or the until condition, the system issues a filter query based on the plurality of stage types specified in the query. This allows the filtering process to align directly with the types of stages that will be processing the resources.

Resource evaluation: Each resource from the resource provider is evaluated based on the plurality of stage types. This evaluation process considers how a resource relates to the different types of stages in the query, potentially determining if the resource is compatible or relevant to these stage types.

Resource selection: The system selects resources for inclusion in the first plurality of input stage items based on this evaluation against the stage types. This allows for a selection process that takes into account the overall structure and processing capabilities of the query.

By incorporating the plurality of stage types into the filtering process, this method provides the staged query system with a way to select resources that are most relevant to the specific stages in the query. It allows the system to potentially optimize resource retrieval by considering the types of processing that will occur in the stage graph. This can lead to more efficient query execution by ensuring that only resources compatible with or relevant to the query's stage types are selected for processing, potentially reducing unnecessary data transfer and processing for resources that wouldn't be effectively utilized by the specified stages.

Within the staged query system, "allocating" refers to the process of selecting which resource provider to use when obtaining the next resource. This allocation may, for example, follow a round-robin scheme, alternating between resource providers in a consistent order for each returned stage item. One method that the stage query system may use to perform allocating includes:

Selection of resource provider: The system selects a resource provider from a plurality of available providers based on an include stage path. This allows the allocation process to be guided by the specific stages or paths that are relevant to the query.

Resource retrieval: Once a provider is selected, the system receives a resource from that provider.

Output determination: The system then determines whether to output a stage item associated with the received resource. This determination is made based on the include stage path, ensuring that the resource aligns with the query's requirements.

Conditional output or caching: If the system determines that the stage item should be output, it does so. Otherwise, the stage item is cached for potential future use.

This method of allocation provides several benefits. For example, it allows for more targeted resource retrieval by considering the include stage path when selecting a provider. It also introduces a filtering step at the allocation level, potentially reducing unnecessary data transfer. The caching mechanism allows for efficient handling of resources that may not be immediately relevant but could be useful later in the query process. By implementing this allocation method, the staged query system can potentially optimize its resource utilization and query performance, especially for queries with specific stage path requirements.

Another example of an allocation method that the staged query system may implement considers multiple stage paths and their corresponding propagate operations. This method provides more granular control over resource selection and processing. The key differences between this method and the method described above are:

Resource provider selection: Instead of using a single include stage path, the system selects a resource provider based on a plurality of stage paths and their corresponding propagate operations. This allows for more complex and nuanced allocation criteria, potentially optimizing the selection of resource providers based on the query's structure and processing requirements.

Output determination: The system determines whether to output a stage item associated with the received resource based on the plurality of stage paths and corresponding propagate operations. This evaluation process considers how a resource would be processed and propagated through various paths in the stage graph, allowing for more refined decision-making about resource utilization.

By incorporating multiple stage paths and propagate operations into the allocation process, this method provides the staged query system with greater flexibility in resource provider selection and resource utilization. It allows the system to consider not just where a resource might be processed in the stage graph, but also how it would be handled at each stage. This can lead to more efficient query execution by ensuring that resources are allocated from providers that are most relevant to the query's structure and operations. The caching mechanism remains consistent with the previous method, allowing for efficient handling of resources that may not be immediately relevant but could be useful later in the query process.

Another example of an allocation method that the staged query system may implement considers the first until condition. This method provides dynamic control over resource selection and processing based on the query's termination criteria. The key differences between this method and the methods described above are:

Resource provider selection: Instead of using stage paths or propagate operations, the system selects a resource provider based on the first until condition specified in the take command. This allows for allocation criteria that align directly with the query's termination conditions, potentially optimizing the selection of resource providers based on the query's intended scope or limit.

Output determination: The system determines whether to output a stage item associated with the received resource based on the first until condition. This evaluation process considers how a resource relates to the conditions that would cause the query to stop taking items, allowing for more targeted decision-making about resource utilization.

By incorporating the first until condition into the allocation process, this method provides the staged query system with a way to dynamically adjust resource provider selection and resource utilization based on the query's runtime parameters. It allows the system to consider not just where or how a resource might be processed in the stage graph, but also how it relates to the query's termination criteria. This can lead to more efficient query execution by ensuring that resources are allocated from providers that are most relevant to the query's intended scope or limit. The caching mechanism remains consistent with the previous methods, allowing for efficient handling of resources that may not be immediately relevant but could be useful later in the query process.

Another example of an allocation method that the staged query system may implement considers the plurality of stage types specified in the query. This method provides type-based control over resource selection and processing aligned with the overall structure of the query. The key differences between this method and the methods described above are:

Resource provider selection: Instead of using stage paths, propagate operations, or the until condition, the system selects a resource provider based on the plurality of stage types specified in the query. This allows for allocation criteria that align directly with the types of stages that will be processing the resources, potentially optimizing the selection of resource providers based on the query's structure and processing capabilities.

Output determination: The system determines whether to output a stage item associated with the received resource based on the plurality of stage types. This evaluation process considers how a resource relates to the different types of stages in the query, allowing for more targeted decision-making about resource utilization based on the compatibility or relevance of the resource to these stage types.

By incorporating the plurality of stage types into the allocation process, this method provides the staged query system with a way to dynamically adjust resource provider selection and resource utilization based on the overall structure of the query. It allows the system to consider not just where or how a resource might be processed in the stage graph, but also its compatibility with the specific types of stages in the query. This can lead to more efficient query execution by ensuring that resources are allocated from providers that are most relevant to the query's stage types, potentially reducing unnecessary data transfer and processing for resources that wouldn't be effectively utilized by the specified stages. The caching mechanism remains consistent with the previous methods, allowing for efficient handling of resources that may not be immediately relevant but could be useful later in the query process.

The first condition in the staged query system can take various forms, providing flexibility in defining termination criteria for take operations. This condition allows for fine-tuned control over query execution and resource utilization. One way of implementing the first condition combines stage paths and a numerical threshold. This approach uses the following components:
- A stage path set: This set includes at least one stage path, allowing the condition to target specific paths in the stage graph.
- A particular number: This number serves as a threshold for the termination condition.
- A satisfaction criterion: The condition is satisfied when at least the specified number of stage items have been received by the stage paths in the set.

This implementation of the first condition enables more granular control over query execution by allowing the system to terminate the take operation based on the number of items processed through specific paths in the stage graph. It can be particularly useful for optimizing query performance and resource utilization, as it allows the query to focus on specific paths of interest and stop processing once a sufficient number of items have been handled by those paths.

The staged query system provides mechanisms for fine-tuning query execution by allowing selective processing of stages. Two key embodiments (which may be implemented within a single embodiment) offer different approaches to controlling stage processing. First, one embodiment allows the query to specify stage paths to exclude from processing. The system determines which stages correspond to the excluded paths and prevents these stages from receiving input stage items. This approach optimizes performance by skipping unnecessary stages, potentially reducing processing time and resource usage. In another embodiment, the query specifies stage paths to explicitly include in processing. The system determines which stages correspond to the included paths and ensures these stages receive input stage items. This approach guarantees that specific stages are processed even if they might be bypassed under normal circumstances, providing precise control over the query execution path.

These implementations offer several benefits to the staged query system, such as:
- Flexibility: Users can tailor the query execution to their specific needs, either by excluding irrelevant stages or ensuring critical stages are included.
- Performance Optimization: By excluding unnecessary stages, the system can reduce processing overhead and improve overall query performance.
- Precise Control: Users have granular control over the query execution path, allowing for complex query structures and targeted data processing.
- Resource Efficiency: By processing only the necessary stages, the system can optimize resource utilization, potentially reducing computational and memory requirements.
- Adaptability: These implementations allow the staged query system to adapt to various use cases and data structures, enhancing its versatility across different applications.

By providing both exclusion and inclusion mechanisms, the staged query system offers a comprehensive toolkit for query optimization and customization. Users can leverage these implementations to create highly efficient and targeted queries, tailoring the system's behavior to their specific data processing requirements.

The staged query system incorporates mechanisms for dynamically generating and modifying the structure of queries, enhancing its flexibility and adaptability. Two key embodiments (which may be implemented within a single embodiment) offer different approaches to automatically generating and inserting stage types. In one embodiment, the staged query system may perform targeted insertion of a generated stage type. This implementation allows for the insertion of an automatically generated stage type at a specific index within the plurality of stage types in the query. The process may include: receiving a specified index into the plurality of stage types; automatically generating a new stage type; and inserting the generated stage type at the specified index in the query's stage type list. This approach provides flexibility in query construction by allowing dynamic modification of the query structure at precise points.

In another embodiment, the staged query system may perform automatic generation of stage types. This embodiment takes a more comprehensive approach by automatically generating the entire plurality of stage types in the first specified order for the query. This method potentially allows for fully dynamic query construction based on various factors or algorithms.

The staged query system may automatically generate stage types in any of a variety of ways to enhance flexibility and adaptability, some examples of which are:
- Template-based generation: The system may utilize predefined templates for common query patterns and automatically generate stage types based on these templates. This approach allows for quick creation of standard query structures while still allowing for customization.
- Data-driven generation: By analyzing the structure and characteristics of the input data, the system may automatically generate appropriate stage types. This method adapts the query structure to the specific data being processed, potentially optimizing performance.
- Machine learning-based generation: The system may employ machine learning algorithms to learn from past queries and their performance, generating stage types that are likely to be effective for similar data or query objectives. As a particular example, the system may use one or more large language models (LLMs) to generate one or more stage types based on any of the data disclosed herein.
- Rule-based generation: Based on predefined rules and heuristics, the system may automatically generate stage types that match certain criteria or objectives specified in the query.
- Dynamic optimization: The system may start with a basic set of stage types and dynamically generate or modify them during query execution based on intermediate results or performance metrics.
- User intent inference: By analyzing the query parameters and context, the system may infer the user's intent and automatically generate appropriate stage types to fulfill that intent.
- Adaptive generation: The system may generate stage types that adapt to changing data characteristics or query requirements during execution, allowing for more robust and flexible querying.
- Composite generation: The system may combine multiple simpler stage types to automatically create more complex, composite stage types that address specific querying needs.

Automatic stage type generation offers several benefits to the staged query system. For example, they allow for real-time adjustments to the query structure, potentially based on runtime conditions or optimization strategies. By automatically generating stage types, the system can potentially optimize query structure without manual intervention, improving overall performance and efficiency. These methods provide mechanisms for tailoring queries to specific data processing needs or adapting to changing requirements, enhancing the system's versatility. They offer ways to extend query capabilities by introducing new stage types dynamically, potentially allowing for integration of new processing methods or data sources. The system can adjust to different data structures or processing requirements on-the-fly, making it more robust and capable of handling diverse scenarios.

By providing both targeted insertion and complete generation of stage types, the staged query system offers a comprehensive toolkit for query optimization and customization. Users can leverage these implementations to create highly efficient and adaptable queries, tailoring the system's behavior to their specific data processing requirements and potentially improving overall system performance.

Embodiments of the present invention may combine multiple groups (e.g., all of the groups) from one stages into a single group or a smaller number of groups. Such a "combine groups" operation may, for example, be associated with a particular stage type, and with stages of that stage type. The multiple groups that are combined may have the same or different group IDs as each other.

Embodiments of the present invention may combine multiple groups having the same group ID, from a particular stage or from multiple stages, into a single combined group in a single stage instance. The combined group may have the same group ID as the source groups. Such a "combine stages" operation may, for example, be associated with a particular stage type, and with stages of that stage type.

In some embodiments, the create query operation 102 may further specify an excluded resource provider. When executing the first take command 106, the system may include a step to exclude resources from the excluded resource provider from processing. This feature allows for more targeted and efficient query execution by enabling the system to ignore specific resource providers that are not relevant to the current query or that should be excluded for other reasons. For example, by specifying an excluded resource provider during the create query operation, users can preemptively filter out resources from providers that are known to be irrelevant or potentially problematic for the specific query at hand. This can help optimize query performance and reduce unnecessary processing of irrelevant data.

When the first take command 106 is executed, the system may implement logic to check each resource against the list of excluded providers before processing. Resources originating from the excluded provider may be skipped, ensuring that they do not enter the stage graph or undergo any further processing within the query execution pipeline.

In some embodiments of the invention, the staged query system implements an optimization for efficiently handling repeated grouping operations. Specifically, when the staged query system first creates a group (such as the first group), it may create a corresponding data structure to represent that group. This data structure may contain information such as the group's ID, associated resources, and any other relevant metadata. In subsequent executions of the method, when resources need to be grouped into an existing group (such as the first group), the system may reuse the previously created group data structure. This eliminates the need to recreate the group structure from scratch each time.

This optimization offers several benefits. For example, by avoiding the need to recreate group structures in subsequent operations, the system can reduce processing time and computational overhead. Reusing existing group structures can lead to more efficient memory utilization, especially in scenarios involving large numbers of groups or frequent regrouping operations. Maintaining persistent group structures across multiple executions of the method can help ensure consistency in how resources are organized and referenced throughout the query process.

In some embodiments of the staged query system, a single resource identifier may be associated with multiple stage items, such as during the execution of a take command. This feature enhances the flexibility and efficiency of resource representation within the query process. For example, when the system obtains a resource identifier, it may associate that ID with a stage item. This creates a link between the resource and its representation within the query structure. The same resource ID may be associated with multiple stage items. This allows a single resource to have multiple representations or be processed in different ways within the query. A single stage item may be in multiple groups simultaneously. This enables more complex and nuanced organization of resources within the query structure. As a result of the above capabilities, a single resource may be in multiple groups simultaneously. This provides a significant advantage over traditional file systems, which typically limit resources to a single category or folder.

In some embodiments of the staged query system, a stage type may further specify a stage input filter corresponding to that stage. This filter determines which stage items will be processed by that particular stage. This feature introduces an additional filtering mechanism at the individual stage level, allowing for more granular control over which stage items are processed at each step of the query execution. When executing a take operation, the system may apply a stage's stage input filter to stage items. This process removes any stage items that do not satisfy the stage's filter criteria, resulting in a filtered plurality of stage items. The system then groups the filtered plurality of stage items, rather than the original unfiltered set.

This approach offers several benefits to the staged query system. For example, by filtering out irrelevant items early in each stage, the system can reduce the amount of data that needs to be processed, potentially improving overall query performance. The ability to define stage-specific filtering criteria allows for more complex and nuanced query structures, adapting to diverse querying scenarios. Filtering items before grouping minimizes the amount of data transferred between stages, which can enhance system performance, especially in distributed environments. The stage-specific filters enable more accurate and targeted query results by excluding irrelevant data at multiple points in the query process. Stage-specific filters can be adjusted independently, allowing for easy modification of query behavior without altering the overall query structure.

In some embodiments of the staged query system, the query may further specify an order in which to iterate through a plurality of resource providers when retrieving stage items. This feature adds an additional layer of control over how resources are accessed and processed during query execution. For example, the create query operation 102 may include a parameter that defines the sequence in which resource providers should be accessed. The system may then pull stage items from the specified resource providers in the order defined by the query.

This approach offers several benefits to the staged query system. For example, by specifying an order for resource providers, the system can prioritize certain providers over others. This can be particularly useful when some providers are known to contain more relevant or higher-quality data for a specific query. The ability to specify an order allows for more controlled distribution of load across different resource providers, potentially improving overall system performance, especially in scenarios involving multiple or diverse data sources. A specified order ensures that resources are always pulled in the same sequence across multiple query executions, which can be important for reproducibility and debugging purposes. The order may be tailored to optimize query performance based on factors such as provider response times, data volumes, or the specific requirements of the query. This allows for fine-tuning of the query execution process to achieve optimal efficiency. This feature provides users with more fine-grained control over the query execution process, allowing them to adapt the resource retrieval strategy to their specific needs or to the characteristics of different resource providers.

In some embodiments of the staged query system, the query may further specify an order in which to return stage items to the first stage during the query execution process. This feature adds an additional layer of control over how resources are processed and organized within the system. For example, the query (e.g., create operation) may include a parameter that defines the sequence in which stage items should be returned. The system may then provide the first plurality of stage items to the first stage in the order defined by the query.

This approach offers several benefits to the staged query system. For example, by specifying an order for returning stage items, the system may prioritize certain items over others. This can be particularly useful when some items are known to be more relevant or critical for the query's objectives. A specified order ensures that stage items are always provided to the first stage in the same sequence across multiple query executions, which can be important for reproducibility and debugging purposes. The order may be tailored to optimize query performance based on factors such as item importance, processing requirements, or the specific needs of the first stage. This allows for fine-tuning of the query execution process to achieve optimal efficiency. This feature also provides users with more fine-grained control over the query execution process, allowing them to adapt the item processing strategy to their specific needs or to the characteristics of different stage types. By controlling the order of stage items, users can implement more sophisticated query logic that depends on the sequence in which items are processed. This enables more complex and nuanced querying scenarios.

The sequential processing performed by the take operation in the staged query system offers several key benefits:

Incremental Processing and Scalability: The take command enables incremental retrieval and processing of resources, allowing efficient handling of datasets of any size, from small collections to massive or infinite data stores. This approach avoids loading all resources into memory at once, providing a significant advantage over traditional query systems.

Fine-grained Control and Dynamic Adaptation: The take operation provides precise control over resource processing and grouping at each stage. The resource iterator can dynamically adapt to query operations, progressively caching, filtering, ordering, and prioritizing resources in response to incremental query operations.

Flexible Termination and Early Results: The "until" condition in the take command allows for precise control over the scope of data processing and enables queries to adapt to runtime conditions. This feature, combined with incremental processing, allows users to start receiving results earlier, which is particularly beneficial for time-sensitive queries or large datasets.

Efficient Resource Management: By processing data in manageable chunks, the system optimizes performance and reduces the risk of resource exhaustion, allowing for better management of memory usage and computational resources.

Support for Infinite Resource Providers: The take operation is crucial when dealing with "infinite" resource sources that generate resources algorithmically. It enables the system to handle potentially unlimited data streams efficiently and provide meaningful results without getting stuck in endless processing loops.

Some practical examples of infinite resource providers include generative AI systems (which may continuously generate text, images, or other content based on prompts or parameters); real-time sensor data (such as IoT devices or environmental sensors producing continuous data streams); social media feeds (e.g., platforms generating constant streams of user-generated content); algorithmic data generators (e.g., systems producing infinite series of numbers or data points); and streaming services (e.g., music or video platforms offering seemingly endless content). By implementing the take operation, the staged query system can effectively manage these infinite (or very large) resource scenarios, providing timely and relevant results while avoiding the limitations of traditional query systems that might attempt to process entire datasets before returning results.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, a variety of features disclosed herein cannot be implemented mentally or manually due to their inherent reliance on computer technology and the scale and complexity of the operations involved. For example, embodiments of the present invention may use resource identifiers (RIDs) to represent diverse digital resources across multiple providers. This allows for unified access and management of resources from various sources, which is not feasible to implement mentally or manually, at least due to the volume and complexity of data involved. Furthermore, the staged query system creates a dynamic graph structure of groups and grouped output items as it processes resources through multiple stages. This complex, hierarchical organization of data is not practically achievable through mental or manual means, especially when dealing with large datasets.

The system's ability to process resources incrementally, handling large or even infinite datasets efficiently, is a feature that relies on computer processing power and memory management. This cannot be replicated mentally or manually, particularly for substantial data volumes. The system can process multiple stages and groups concurrently, as evidenced by the use of multiple instances of stages (e.g., first and second instances of the second stage). This parallel processing capability is inherently a computer-based feature.

The resource iterator's ability to progressively cache, filter, order, and prioritize resources in response to incremental query operations is a feature that relies on computer memory and processing capabilities. The system's ability to adapt queries based on intermediate results or changing conditions during execution is a feature that requires real-time computational analysis and decision-making. The system's capability to process and organize a wide range of digital assets, including files, documents, media streams, database records, and even generated or derived content, is not feasible to implement manually due to the diversity and complexity of these resources. The system's ability to handle large-scale datasets and complex queries efficiently is inherently a computer-based feature, as it relies on the processing power and memory capabilities of computer systems.

Embodiments of the present invention transform subject matter into a different state or thing in ways that have practical utility through its staged query system. For example, the system may transform diverse digital resources from multiple providers into stage items, allowing for unified access and management of heterogeneous data sources, effectively transforming disparate digital assets into a cohesive, queryable dataset.

As the system processes stage items through multiple stages, it transforms the input data into a dynamic graph structure of groups and grouped output items, organizing the data into a hierarchical structure that enables more sophisticated querying and analysis capabilities. The system can transform the content of resources into summaries and extract keywords, changing the state of the original data into more concise and analyzable forms. This transformation has practical utility in scenarios requiring quick understanding or categorization of large volumes of content. Through stages like "combine-stages" and "combine-groups", the system transforms multiple separate data groups into consolidated structures, simplifying complex data relationships and enabling more efficient analysis and querying.

The system can transform a set of resources from various sources into groups based on their providers, changing the organizational state of the data and providing practical utility for provider-specific analysis or management. The system may transform potentially infinite or very large datasets into manageable, processed chunks through its incremental processing capability, allowing for practical analysis and querying of data that would otherwise be too large to handle efficiently.

The sequence of stage types transforms input data through multiple processing steps, each changing the state of the data and adding layers of analysis and organization. This multi-stage transformation results in highly processed and organized data with practical utility for complex querying and analysis tasks. These transformations collectively demonstrate the ability of embodiments of the present invention to change the state of digital resources in ways that have significant practical utility. The system's capacity to transform diverse, unstructured, or semi-structured data into well-organized, analyzed, and queryable forms enables more efficient data management, analysis, and decision-making processes across various domains and applications.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or grayscale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A computer-implemented method comprising:
(A) receiving a query that specifies a plurality of stage types in a first specified order, wherein each stage type S in the plurality of stage types specifies:
a processing method, corresponding to stage S, for processing stage items; and
a grouping method, corresponding to stage S, for grouping stage items;
(B) executing a first take command, wherein the first take command specifies:
a first from source to take from, wherein the first from source comprises a first stage item;
a first until condition;
wherein executing the first take command comprises, until the first until condition is satisfied:
(B)(1) receiving, from a first resource iterator, a stage item associated with a corresponding resource; thereby receiving a first plurality of input stage items from the first resource iterator;
(C) providing the first plurality of input stage items to a first stage having a root group ID, the first stage being first in the first specified order of the plurality of stage types;
(D) processing, by the first stage, the first plurality of input stage items to produce a first plurality of output stage items, as part of a first propagate operation, wherein the first propagate operation is of a "process" type, using the processing method specified by the first stage type, the processing comprising:
(D)(1) receiving the first plurality of input stage items;
(D)(2) processing, by the first stage, the first plurality of input stage items to produce a first plurality of output stage items; and
(D)(3) grouping, by the first stage, using the grouping method corresponding to the first stage, the first plurality of output stage items to produce a first plurality of groups, the first plurality of groups comprising a first group and a second group, the grouping comprising:
(D)(3) (a) creating the first plurality of groups;
(D)(3) (b) assigning, to each group in the first plurality of groups, a corresponding group ID; and
(D)(3) (c) assigning, to each group in the first plurality of groups, corresponding output stage items from the first plurality of output stage items;
(E) providing the first group to a first instance of a second stage, the second stage being second in the first specified order of the plurality of stage types;
(F) providing the second group to a second instance of the second stage;
(G) processing, by the first instance of the second stage, the first group, as part of a second propagate operation, wherein the second propagate operation is of the "process" type, using the processing method specified by the second stage type, the processing comprising:
(G)(1) receiving the first group as a second plurality of input stage items;
(G)(2) processing, by the first instance of the second stage, the second plurality of input stage items to produce a second plurality of output stage items;
(G)(3) grouping, by the first instance of the second stage, using the grouping method corresponding to the second stage, the second plurality of output stage items to produce a second plurality of groups comprising a third group and a fourth group, the grouping comprising:
(G)(3) (a) creating the second plurality of groups;
(G)(3) (b) assigning, to each group in the second plurality of groups, a corresponding group ID;
(G)(3) (c) assigning, to each group in the second plurality of groups, corresponding output stage items from the second plurality of output stage items;
(H) processing, by the second instance of the second stage, the second group, as part of a third propagate operation, wherein the third propagate operation is of the "process" type, using the processing method specified by the second stage type, the processing comprising:
(H)(1) receiving the second group as a third plurality of input stage items;
(H)(2) processing, by the second instance of the second stage, the third plurality of input stage items to produce a third plurality of output stage items; and (H)(3) grouping, by the second instance of the second stage, using the grouping method corresponding to the second stage, the third plurality of output stage items to produce a third plurality of groups comprising a fifth group and a sixth group, the grouping comprising:
(H)(3)(a) creating the third plurality of groups;
(H)(3)(b) assigning, to each group in the third plurality of groups, a corresponding group ID;
(H)(3)(c) assigning, to each group in the third plurality of groups, corresponding output stage items from the third plurality of output stage items.

2. The method of claim 1, further comprising:
(I) providing the third plurality of grouped output stage items to a first instance of a third stage, wherein the first instance of the third stage is third in the first specified order of the plurality of stage types;
(J) providing the fourth plurality of grouped output stage items to a second instance of the third stage;
(K) providing the fifth plurality of grouped output stage items to a third instance of the third stage; and
(L) providing the sixth plurality of grouped stage items to a fourth instance of the third stage.

3. The method of claim 2, further comprising receiving a list of stage paths, wherein each stage path in the list of stage paths is associated with a corresponding propagate operation selected from a set of propagate operations, the set of propagate operations comprising "process", "discard", "group-discard", and "queue" propagate operations.

4. The method of claim 3, wherein the set of propagate operations includes explicit propagate operations.

5. The method of claim 3, wherein the set of propagate operations includes implicit default propagate operations.

6. The method of claim 3, further comprising:
(M) processing, by the first instance of the third stage, the third plurality of grouped output stage items, using a processing method specified by a stage type of the first instance of the third stage, the processing comprising:
(M)(1) receiving the third plurality of grouped output stage items as a fourth plurality of input stage items;
(M)(2) identifying a stage path of the fourth plurality of input stage items;
(M)(3) identifying the propagate operation corresponding to the stage path identified in (M)(2); and
(M)(4) performing the identified propagate operation on the fourth plurality of input stage items.

7. The method of claim 6, wherein receiving the query comprises receiving the list of stage paths in the query.

8. The method of claim 6, wherein the first take command specifies the list of stage paths.

9. The method of claim 3, further comprising:
(M) processing, by the first instance of the third stage, the third plurality of grouped output stage items, as part of a fourth propagate operation, wherein the fourth propagate operation is of a "discard" type, using a processing method specified by a stage type of the first instance of the third stage, the processing comprising:
(M)(1) receiving the third plurality of grouped output stage items as a fourth plurality of input stage items; and
(M)(2) discarding the fourth plurality of grouped input stage items after receiving them.

10. The method of claim 3, further comprising:
(M) processing, by the first instance of the third stage, the third plurality of grouped output stage items, as part of a fourth propagate operation, wherein the fourth propagate operation is of a "queue" type, using a processing method specified by a stage type of the first instance of the third stage, the processing comprising:
(M)(1) receiving the third plurality of grouped output stage items as a fourth plurality of input stage items; and
(M)(2) placing the fourth plurality of grouped input stage items into a first queue after receiving them.

11. The method of claim 10, further comprising:
(N) executing a second take command, wherein the second take command specifies:
a second from source to take from, wherein the second from source comprises the first queue; and
a second until condition;
wherein executing the second take command comprises, until the second until condition is satisfied:
(N)(1) receiving, from the first queue, a stage item;
thereby taking a second plurality of stage items from the first queue.

12. The method of claim 1, further comprising:
(N) processing, by the first instance of the third stage, the third plurality of grouped output stage items, as part of a fourth propagate operation, wherein the fourth propagate operation is of a "group discard" type, using a processing method specified by a stage type of the first instance of the third stage, the processing comprising:
(N)(1) receiving the third plurality of grouped output stage items as a fourth plurality of input stage items;
(N)(2) processing, by the first instance of the third stage, the fourth plurality of input stage items to produce a fourth plurality of output stage items; and
(N)(3) grouping, by the first instance of the third stage, using the grouping method corresponding to the first instance of the third stage, the fourth plurality of output stage items to produce a fourth plurality of groups, the fourth plurality of groups comprising a seventh group and an eighth group, the grouping comprising:
(N)(3) (a) creating the fourth plurality of groups;
(N)(3) (b) assigning, to each group in the fourth plurality of groups, a corresponding group ID; and
(N)(3) (c) discarding the fourth plurality of output stage items, and retaining the fourth plurality of groups.

13. The method of claim 1, further comprising:
(1) executing a second take command, wherein the second take command specifies:
a second from source to take from, wherein the second from source comprises the first resource iterator;
a second until condition;
wherein executing the second take command comprises, until the second until condition is satisfied:
(I)(1) receiving, from the first resource iterator, a stage item associated with a resource;
thereby receiving a fourth plurality of input stage items from the first resource iterator.

14. The method of claim 1, wherein receiving, from the first resource iterator, the stage item associated with the corresponding resource in step (B)(1) comprises filtering resources for the first plurality of input stage items based on the plurality of stage types, wherein the filtering comprises:
issuing a filter query, based on an include stage path, to the resource provider;
evaluating each resource from the resource provider based on the include stage path; and
selecting resources that based on the evaluation to be included in the first plurality of input stage items.

15. The method of claim 1, wherein receiving, from the first resource iterator, the stage item associated with the corresponding resource in step (B)(1) comprises filtering resources for the first plurality of input stage items based on the plurality of stage types, wherein the filtering comprises:
issuing a filter query, based on a plurality of stage paths and corresponding propagate operations, to the resource provider;
evaluating each resource from the resource provider based on the plurality of stage paths and corresponding propagate operations; and
selecting resources that based on the evaluation to be included in the first plurality of input stage items.

16. The method of claim 1, wherein receiving, from the first resource iterator, the stage item associated with the corresponding resource in step (B)(1) comprises filtering resources for the first plurality of input stage items based on the plurality of stage types, wherein the filtering comprises:
issuing a filter query, based on the first until condition, to the resource provider;
evaluating each resource from the resource provider based on the first until condition; and
selecting resources that based on the evaluation to be included in the first plurality of input stage items.

17. The method of claim 1, wherein receiving, from the first resource iterator, the stage item associated with the corresponding resource in step (B)(1) comprises filtering resources for the first plurality of input stage items based on the plurality of stage types, wherein the filtering comprises:
issuing a filter query, based on the plurality of stage types, to the resource provider;
evaluating each resource from the resource provider based on the plurality of stage types; and
selecting resources that based on the evaluation to be included in the first plurality of input stage items.

18. The method of claim 1, wherein receiving, from the first resource iterator, the stage item associated with a corresponding resource in (B)(1) comprises:
selecting a resource provider, from a plurality of resource providers, based on an include stage path;
receiving a resource from the selected resource provider;
determining, based on the include stage path, whether to output a stage item associated with the resource received from the selected resource provider;
if it is determined to output a stage item associated with the resource received from the selected resource provider, then outputting the stage item associated with the resource received from the selected resource provider;
otherwise, caching the stage item associated with the resource received from the selected resource provider.

19. The method of claim 1, wherein receiving, from the first resource iterator, the stage item associated with a corresponding resource in (B)(1) comprises:
selecting a resource provider, from a plurality of resource providers, based on a plurality of stage paths and corresponding propagate operations;
receiving a resource from the selected resource provider;
determining, based on the plurality of stage paths and corresponding propagate operations, whether to output a stage item associated with the resource received from the selected resource provider;
if it is determined to output a stage item associated with the resource received from the selected resource provider, then outputting the stage item associated with the resource received from the selected resource provider;
otherwise, caching the stage item associated with the resource received from the selected resource provider.

20. The method of claim 1, wherein receiving, from the first resource iterator, the stage item associated with a corresponding resource in (B)(1) comprises:
selecting a resource provider, from a plurality of resource providers, based on the first until condition;
receiving a resource from the selected resource provider;
determining, based on the first until condition, whether to output a stage item associated with the resource received from the selected resource provider;
if it is determined to output a stage item associated with the resource received from the selected resource provider, then outputting the stage item associated with the resource received from the selected resource provider;
otherwise, caching the stage item associated with the resource received from the selected resource provider.

21. The method of claim 1, wherein receiving, from the first resource iterator, the stage item associated with a corresponding resource in (B)(1) comprises:
selecting a resource provider, from a plurality of resource providers, based on the plurality of stage types;
receiving a resource from the selected resource provider;
determining, based on the plurality of stage types, whether to output a stage item associated with the resource received from the selected resource provider;
if it is determined to output a stage item associated with the resource received from the selected resource provider, then outputting the stage item associated with the resource received from the selected resource provider;
otherwise, caching the stage item associated with the resource received from the selected resource provider.

22. The method of claim 1:
wherein the query received in (A) further specifies at least one stage path to exclude; and
wherein the method further comprises:
determining, based on the at least one stage path to exclude, at least one stage to exclude; and
for each stage to exclude, preventing the stage from receiving input stage items.

23. The method of claim 1:
wherein the query received in (A) further specifies at least one path to include; and
wherein the method further comprises:
determining, based on the at least one stage path to include, at least one stage to include in processing; and
for each stage to include in processing, allowing the stage to receive input stage items.

24. The method of claim 1, wherein (A) comprises:
receiving a specified index into the plurality of stage types;
automatically generating a stage type; and
inserting the stage type at the specified index in the plurality of stage types in the query.

25. The method of claim 1, wherein (A) comprises:
automatically generating the plurality of stage types in the first specified order in the query.

26. The method of claim 1, further comprising:
(I) providing the third group and the fourth group to a first instance of a third stage, wherein the first instance of the third stage is third in the first specified order of the plurality of stage types; and
(J) at the first instance of the third stage, combining the third group and the fourth group into a new group.

27. The method of claim 1:
wherein the third group and the fifth group share a first group ID;

wherein the fourth group and the sixth group share a second group ID that differs from the first group ID; and wherein the method further comprises providing, within a first instance of a third stage:
 a seventh group that includes all output stage items from the third group and the fifth group, wherein the seventh group has the first group ID; and
 an eighth group that includes all output stage items from the fourth group and the sixth group, wherein the eighth group has the second group ID.

28. A system comprising at least one non-transitory computer-readable medium having computer program instructions stored thereon, the computer program instructions being executable by at least one computer processor to perform a method, the method comprising:
 (A) receiving a query that specifies a plurality of stage types in a first specified order, wherein each stage type S in the plurality of stage types specifies:
  a processing method, corresponding to stage S, for processing stage items; and
  a grouping method, corresponding to stage S, for grouping stage items;
 (B) executing a first take command, wherein the first take command specifies:
  a first from source to take from, wherein the first from source comprises a first stage item;
  a first until condition;
  wherein executing the first take command comprises, until the first until condition is satisfied:
   (B)(1) receiving, from a first resource iterator, a stage item associated with a corresponding resource;
   thereby receiving a first plurality of input stage items from the first resource iterator;
 (C) providing the first plurality of input stage items to a first stage having a root group ID, the first stage being first in the first specified order of the plurality of stage types;
 (D) processing, by the first stage, the first plurality of input stage items to produce a first plurality of output stage items, as part of a first propagate operation, wherein the first propagate operation is of a "process" type, using the processing method specified by the first stage type, the processing comprising:
  (D)(1) receiving the first plurality of input stage items;
  (D)(2) processing, by the first stage, the first plurality of input stage items to produce a first plurality of output stage items; and
   (D)(3) grouping, by the first stage, using the grouping method corresponding to the first stage, the first plurality of output stage items to produce a first plurality of groups, the first plurality of groups comprising a first group and a second group, the grouping comprising:
    (D)(3)(a) creating the first plurality of groups;
    (D)(3)(b) assigning, to each group in the first plurality of groups, a corresponding group ID; and
    (D)(3)(c) assigning, to each group in the first plurality of groups, corresponding output stage items from the first plurality of output stage items;
 (E) providing the first group to a first instance of a second stage, the second stage being second in the first specified order of the plurality of stage types;
 (F) providing the second group to a second instance of the second stage;
 (G) processing, by the first instance of the second stage, the first group, as part of a second propagate operation, wherein the second propagate operation is of the "process" type, using the processing method specified by the second stage type, the processing comprising:
  (G)(1) receiving the first group as a second plurality of input stage items;
  (G)(2) processing, by the first instance of the second stage, the second plurality of input stage items to produce a second plurality of output stage items;
  (G)(3) grouping, by the first instance of the second stage, using the grouping method corresponding to the second stage, the second plurality of output stage items to produce a second plurality of groups comprising a third group and a fourth group, the grouping comprising:
   (G)(3)(a) creating the second plurality of groups;
   (G)(3)(b) assigning, to each group in the second plurality of groups, a corresponding group ID;
   (G)(3)(c) assigning, to each group in the second plurality of groups, corresponding output stage items from the second plurality of output stage items;
 (H) processing, by the second instance of the second stage, the second group, as part of a third propagate operation, wherein the third propagate operation is of the "process" type, using the processing method specified by the second stage type, the processing comprising:
  (H)(1) receiving the second group as a third plurality of input stage items;
  (H)(2) processing, by the second instance of the second stage, the third plurality of input stage items to produce a third plurality of output stage items; and
  (H)(3) grouping, by the second instance of the second stage, using the grouping method corresponding to the second stage, the third plurality of output stage items to produce a third plurality of groups comprising a fifth group and a sixth group, the grouping comprising:
   (H)(3)(a) creating the third plurality of groups;
   (H)(3)(b) assigning, to each group in the third plurality of groups, a corresponding group ID;
   (H)(3)(c) assigning, to each group in the third plurality of groups, corresponding output stage items from the third plurality of output stage items.

\* \* \* \* \*